US012653199B2

(12) United States Patent

Kalum

(10) Patent No.: US 12,653,199 B2

(45) Date of Patent: Jun. 16, 2026

(54) PULSE AND/OR LEGUME PROTEIN-FORTIFIED DOUGHS AND BAKED GOODS COMPRISING LIPASE

(71) Applicant: Novozymes A/S, Bagsvaerd (DK)

(72) Inventor: Lisbeth Kalum, Vaerloese (DK)

( * ) Notice: Subject to any disclaimer, the term of this patent is extended or adjusted under 35 U.S.C. 154(b) by 835 days.

(21) Appl. No.: 17/998,956

(22) PCT Filed: Dec. 3, 2020

(86) PCT No.: PCT/EP2020/084497

§ 371 (c)(1),
(2) Date: Nov. 16, 2022

(87) PCT Pub. No.: WO2021/239267

PCT Pub. Date: Dec. 2, 2021

(65) Prior Publication Data

US 2023/0276811 A1 Sep. 7, 2023

(30) Foreign Application Priority Data

May 29, 2020 (DK) ............................ PA 2020 00636
Oct. 23, 2020 (EP) ..................................... 20203541

(51) Int. Cl.
A21D 8/04 (2006.01)
A21D 2/26 (2006.01)
(Continued)

(52) U.S. Cl.
CPC ............. A21D 8/042 (2013.01); A21D 2/266 (2013.01); A21D 13/045 (2017.01);
(Continued)

(58) Field of Classification Search
CPC ...................................................... A21D 8/042
See application file for complete search history.

(56) References Cited

U.S. PATENT DOCUMENTS

2003/0059902 A1* 3/2003 Cherry ................. C12N 9/2417
435/320.1
2003/0134023 A1* 7/2003 Anfinsen ................ A21D 13/02
426/549

FOREIGN PATENT DOCUMENTS

CN 108697100 A 10/2018
CN 110720485 A 1/2020
(Continued)

OTHER PUBLICATIONS

Machine translation of JP2002-272357, publication date Sep. 24, 2002, pp. 1-26. (Year: 2002).*

(Continued)

*Primary Examiner* — Jenna A Watts

(74) *Attorney, Agent, or Firm* — Yoshimi D. Barron

(57) ABSTRACT

The invention provides doughs for a baked- or par-baked yeast-raised product, said doughs comprising added pulse and/or legume protein and at least one added lipase enzyme, as well as methods of producing such doughs, the methods comprising the steps of adding pulse and/or legume protein and at least one lipase enzyme to the doughs, and methods of producing baked or par-baked yeast-raised products comprising pulse and/or legume protein, the methods comprising the steps of providing a dough of the invention and baking or par-baking the yeast-raised dough, and finally also uses of enzyme compositions comprising at least one lipase enzyme for maintaining or improving the volume of a baked or par-baked yeast-raised product made from doughs comprising pulse and/or legume protein.

19 Claims, 3 Drawing Sheets

Figure 1:

Specification includes a Sequence Listing.

Dough 1 (Example 1)    Dough 2 (Example 1)    Dough 3 (Example 1)

(51) Int. Cl.
    *A21D 13/045*     (2017.01)
    *A21D 13/064*     (2017.01)

(52) U.S. Cl.
    CPC .... *A21D 13/064* (2013.01); *C12Y 301/01003*
        (2013.01); *C12Y 301/01032* (2013.01); *C12Y*
                *302/01001* (2013.01)

(56)           References Cited

FOREIGN PATENT DOCUMENTS

| | | | |
|---|---|---|---|
| JP | 1124384 | A | 9/1999 |
| JP | 3695388 | B2 | 8/2002 |
| JP | 2002272357 | A | 9/2004 |
| WO | WO-2004099400 | A2 * | 11/2004 ............ A21D 8/042 |
| WO | 2017112734 | A1 | 6/2017 |
| WO | 2017142904 | A1 | 8/2017 |

OTHER PUBLICATIONS

Park et al., Food sci. technol. res., 2004, 127-131, 10(2).
Roldan et al., Frontiers in bioscience, 2007, 89-104, 12.
Sivasankari et al., International Journal of Chemical Studies, 2019, 3430-3434, 7(3).
Weihrauch et al., J Am Oil Chem Soc, 1983, 1971-1978, 60(12).
Yoshida et al., Food chemistry, 2008, 924-928, 112(4).

* cited by examiner

Dough 1 (Example 1)          Dough 2 (Example 1)          Dough 3 (Example 1)

Dough 4 (Example 1)          Dough 5 (Example 1)          Dough 6 (Example 1)

Dough 1 (Ex. 3)     Dough 2 (Ex. 3)     Dough 3 (Ex. 3)     Dough 4 (Ex. 3)

Dough 5 (Ex. 3)     Dough 6 (Ex. 3)     Dough 7 (Ex. 3)     Dough 8 (Ex. 3)

Dough 1 (Ex. 5)    Dough 3 (Ex. 5)    Dough 5 (Ex. 5)    Dough 7(Ex. 5)

Dough 2 (Ex. 5)    Dough 4 (Ex. 5)    Dough 6 (Ex. 5)    Dough 8(Ex. 5)

SEQUENCE LISTING

```
<160> NUMBER OF SEQ ID NOS: 6

<210> SEQ ID NO 1
<211> LENGTH: 274
<212> TYPE: PRT
<213> ORGANISM: Artificial sequence
<220> FEATURE:
<223> OTHER INFORMATION: Variant of the lipase shown in SEQ ID NO:2.
<220> FEATURE:
<221> NAME/KEY: UNSURE
<222> LOCATION: (274)..(274)
<223> OTHER INFORMATION: The C-terminal serine residue is often cleaved
      from the mature lipase. Consequently, %-identity may be calculated
      against the sequence with or without that residue.

<400> SEQUENCE: 1

Glu Val Ser Gln Asp Leu Phe Asn Gln Phe Asn Leu Phe Ala Gln Tyr
1               5                   10                  15

Ser Ala Ala Ala Tyr Cys Gly Lys Asn Asn Asp Ala Pro Ala Gly Thr
            20                  25                  30

Asn Ile Thr Cys Thr Gly Asn Ala Cys Pro Glu Val Glu Lys Ala Asp
```

-continued

```
            35                  40                  45

Ala Thr Phe Leu Tyr Ser Phe Glu Asp Ser Gly Val Gly Asp Val Thr
    50                  55                  60

Gly Phe Leu Ala Leu Asp Asn Thr Asn Lys Leu Ile Val Leu Ser Phe
65                  70                  75                  80

Arg Gly Ser Arg Ser Ile Glu Asn Trp Ile Ala Asn Leu Asn Phe Trp
                85                  90                  95

Leu Lys Lys Ile Asn Asp Ile Cys Ser Gly Cys Arg Gly His Asp Gly
                100                 105                 110

Phe Thr Ser Ser Trp Arg Ser Val Ala Asp Thr Leu Arg Gln Lys Val
                115                 120                 125

Glu Asp Ala Val Arg Glu His Pro Asp Tyr Arg Val Val Phe Thr Gly
    130                 135                 140

His Ser Leu Gly Gly Ala Leu Ala Thr Val Ala Gly Ala Asp Leu Arg
145                 150                 155                 160

Gly Asn Gly Tyr Asp Ile Asp Val Phe Ser Tyr Gly Ala Pro Arg Val
                165                 170                 175

Gly Asn Arg Ala Phe Ala Glu Phe Leu Thr Val Gln Thr Gly Gly Thr
                180                 185                 190

Leu Tyr Arg Ile Thr His Thr Asn Asp Ile Val Pro Arg Leu Pro Pro
                195                 200                 205

Arg Glu Phe Gly Tyr Ser His Ser Ser Pro Glu Tyr Trp Ile Lys Ser
    210                 215                 220

Gly Thr Leu Val Pro Val Thr Arg Asn Asp Ile Val Lys Ile Glu Gly
225                 230                 235                 240

Ile Asp Ala Thr Gly Gly Asn Asn Gln Pro Asn Ile Pro Asp Ile Val
                245                 250                 255

Ala His Leu Trp Tyr Phe Gln Ala Thr Asp Ala Cys Asn Ala Gly Gly
                260                 265                 270

Phe Ser
```

```
<210> SEQ ID NO 2
<211> LENGTH: 269
<212> TYPE: PRT
<213> ORGANISM: Thermomyces lanuginosus

<400> SEQUENCE: 2

Glu Val Ser Gln Asp Leu Phe Asn Gln Phe Asn Leu Phe Ala Gln Tyr
1                   5                   10                  15

Ser Ala Ala Ala Tyr Cys Gly Lys Asn Asn Asp Ala Pro Ala Gly Thr
                20                  25                  30

Asn Ile Thr Cys Thr Gly Asn Ala Cys Pro Glu Val Glu Lys Ala Asp
            35                  40                  45

Ala Thr Phe Leu Tyr Ser Phe Glu Asp Ser Gly Val Gly Asp Val Thr
    50                  55                  60

Gly Phe Leu Ala Leu Asp Asn Thr Asn Lys Leu Ile Val Leu Ser Phe
65                  70                  75                  80

Arg Gly Ser Arg Ser Ile Glu Asn Trp Ile Gly Asn Leu Asn Phe Asp
                85                  90                  95

Leu Lys Glu Ile Asn Asp Ile Cys Ser Gly Cys Arg Gly His Asp Gly
                100                 105                 110

Phe Thr Ser Ser Trp Arg Ser Val Ala Asp Thr Leu Arg Gln Lys Val
                115                 120                 125

Glu Asp Ala Val Arg Glu His Pro Asp Tyr Arg Val Val Phe Thr Gly
```

-continued

```
        130                    135                    140

His Ser Leu Gly Gly Ala Leu Ala Thr Val Ala Gly Ala Asp Leu Arg
145                 150                155                160

Gly Asn Gly Tyr Asp Ile Asp Val Phe Ser Tyr Gly Ala Pro Arg Val
                    165                170                175

Gly Asn Arg Ala Phe Ala Glu Phe Leu Thr Val Gln Thr Gly Gly Thr
                180                185                190

Leu Tyr Arg Ile Thr His Thr Asn Asp Ile Val Pro Arg Leu Pro Pro
            195                200                205

Arg Glu Phe Gly Tyr Ser His Ser Ser Pro Glu Tyr Trp Ile Lys Ser
            210                215                220

Gly Thr Leu Val Pro Val Thr Arg Asn Asp Ile Val Lys Ile Glu Gly
225                 230                235                240

Ile Asp Ala Thr Gly Gly Asn Asn Gln Pro Asn Ile Pro Asp Ile Pro
                245                250                255

Ala His Leu Trp Tyr Phe Gly Leu Ile Gly Thr Cys Leu
            260                265
```

```
<210> SEQ ID NO 3
<211> LENGTH: 273
<212> TYPE: PRT
<213> ORGANISM: Fusarium oxysporum
<220> FEATURE:
<221> NAME/KEY: UNSURE
<222> LOCATION: (273)..(273)
<223> OTHER INFORMATION: The C-terminal serine residue is often cleaved
      from the mature lipase. Consequently, %-identity may be calculated
      against the sequence with or without that residue.

<400> SEQUENCE: 3

Ala Val Gly Val Thr Thr Thr Asp Phe Ser Asn Phe Lys Phe Tyr Ile
1               5                   10                  15

Gln His Gly Ala Ala Ala Tyr Cys Asn Ser Glu Ala Ala Ala Gly Ser
                20                  25                  30

Lys Ile Thr Cys Ser Asn Asn Gly Cys Pro Thr Val Gln Gly Asn Gly
            35                  40                  45

Ala Thr Ile Val Thr Ser Phe Val Gly Ser Lys Thr Gly Ile Gly Gly
        50                  55                  60

Tyr Val Ala Thr Asp Ser Ala Arg Lys Glu Ile Val Val Ser Phe Arg
65                  70                  75                  80

Gly Ser Ile Asn Ile Arg Asn Trp Leu Thr Asn Leu Asp Phe Gly Gln
                85                  90                  95

Glu Asp Cys Ser Leu Val Ser Gly Cys Gly Val His Ser Gly Phe Gln
                100                 105                 110

Arg Ala Trp Asn Glu Ile Ser Ser Gln Ala Thr Ala Ala Val Ala Ser
            115                 120                 125

Ala Arg Lys Ala Asn Pro Ser Phe Asn Val Ile Ser Thr Gly His Ser
            130                 135                 140

Leu Gly Gly Ala Val Ala Val Leu Ala Ala Ala Asn Leu Arg Val Gly
145                 150                 155                 160

Gly Thr Pro Val Asp Ile Tyr Thr Tyr Gly Ser Pro Arg Val Gly Asn
                165                 170                 175

Ala Gln Leu Ser Ala Phe Val Ser Asn Gln Ala Gly Gly Glu Tyr Arg
                180                 185                 190

Val Thr His Ala Asp Asp Pro Val Pro Arg Leu Pro Pro Leu Ile Phe
            195                 200                 205
```

-continued

```
Gly Tyr Arg His Thr Thr Pro Glu Phe Trp Leu Ser Gly Gly Gly Gly
    210                 215                 220

Asp Lys Val Asp Tyr Thr Ile Ser Asp Val Lys Val Cys Glu Gly Ala
225                 230                 235                 240

Ala Asn Leu Gly Cys Asn Gly Gly Thr Leu Gly Leu Asp Ile Ala Ala
                245                 250                 255

His Leu His Tyr Phe Gln Ala Thr Asp Ala Cys Asn Ala Gly Gly Phe
                260                 265                 270

Ser

<210> SEQ ID NO 4
<211> LENGTH: 274
<212> TYPE: PRT
<213> ORGANISM: Artificial sequence
<220> FEATURE:
<223> OTHER INFORMATION: Variant of the lipase shown in SEQ ID NO:2.

<400> SEQUENCE: 4

Glu Val Ser Gln Asp Leu Phe Asn Gln Phe Asn Leu Phe Ala Gln Tyr
1               5                   10                  15

Ser Ala Ala Ala Tyr Cys Gly Lys Asn Asn Asp Ala Pro Ala Gly Thr
                20                  25                  30

Asn Ile Thr Cys Thr Gly Asn Ala Cys Pro Glu Val Glu Lys Ala Asp
            35                  40                  45

Ala Thr Phe Leu Tyr Ser Phe Glu Asp Ser Gly Val Gly Asp Val Thr
        50                  55                  60

Gly Phe Leu Ala Leu Asp Asn Thr Asn Lys Leu Ile Val Leu Ser Phe
65                  70                  75                  80

Arg Gly Ser Arg Ser Ile Glu Asn Trp Ile Ala Asn Leu Asn Phe Trp
                85                  90                  95

Leu Lys Lys Ile Asn Asp Ile Cys Ser Gly Cys Arg Gly His Asp Gly
                100                 105                 110

Phe Thr Ser Ser Trp Arg Ser Val Ala Asp Thr Leu Arg Gln Lys Val
            115                 120                 125

Glu Asp Ala Val Arg Glu His Pro Asp Tyr Arg Val Val Phe Thr Gly
        130                 135                 140

His Ser Leu Gly Gly Ala Leu Ala Thr Val Ala Gly Ala Asp Leu Arg
145                 150                 155                 160

Gly Asn Gly Tyr Asp Ile Asp Val Phe Ser Tyr Gly Ala Pro Arg Val
                165                 170                 175

Gly Asn Arg Ala Phe Ala Glu Phe Leu Thr Val Gln Thr Gly Gly Thr
            180                 185                 190

Leu Tyr Arg Ile Thr His Thr Asn Asp Ile Val Pro Arg Leu Pro Pro
        195                 200                 205

Arg Glu Phe Gly Tyr Ser His Ser Ser Pro Glu Tyr Trp Ile Lys Ser
    210                 215                 220

Gly Thr Leu Val Pro Val Thr Arg Asn Asp Ile Val Lys Ile Glu Gly
225                 230                 235                 240

Ile Asp Ala Thr Gly Gly Asn Asn Gln Pro Asn Ile Pro Asp Ile Pro
                245                 250                 255

Ala His Leu Trp Tyr Phe Gln Ala Thr Asp Ala Cys Asn Ala Gly Gly
                260                 265                 270

Phe Ser

<210> SEQ ID NO 5
```

```
<211> LENGTH: 268
<212> TYPE: PRT
<213> ORGANISM: Valsaria rubricosa

<400> SEQUENCE: 5

Ala Ile Ser Ala Asp Leu Leu Ala Thr Phe Ser Leu Phe Glu Gln Phe
1               5                   10                  15

Ala Ala Ala Ala Tyr Cys Pro Asp Asn Asn Asp Ser Pro Asp Thr Lys
            20                  25                  30

Leu Thr Cys Ser Val Gly Asn Cys Pro Leu Val Glu Ala Asp Thr Thr
            35                  40                  45

Ser Thr Val Thr Glu Phe Glu Asn Ser Leu Glu Thr Asp Val Thr Gly
        50                  55                  60

Tyr Val Ala Thr Asp Ser Thr Arg Glu Leu Ile Val Val Ala Phe Arg
65                  70                  75                  80

Gly Ser Ser Ser Ile Arg Asn Trp Ile Ala Asp Ile Asp Phe Pro Phe
                85                  90                  95

Thr Asp Thr Asp Leu Cys Asp Gly Cys Gln Ala Ala Ser Gly Phe Trp
            100                 105                 110

Thr Ser Trp Thr Glu Ala Arg Thr Gly Val Leu Ala Ala Val Ala Ser
            115                 120                 125

Ala Ala Ala Ala Asn Pro Ser Tyr Thr Val Ala Val Thr Gly His Ser
            130                 135                 140

Leu Gly Gly Ala Val Ala Ala Leu Ala Ala Gly Ala Leu Arg Asn Ala
145                 150                 155                 160

Gly Tyr Thr Val Ala Leu Tyr Ser Phe Gly Ala Pro Arg Val Gly Asp
                165                 170                 175

Glu Thr Leu Ser Glu Tyr Ile Thr Ala Gln Ala Gly Gly Asn Tyr Arg
            180                 185                 190

Ile Thr His Leu Asn Asp Pro Val Pro Lys Leu Pro Pro Leu Leu Leu
            195                 200                 205

Gly Tyr Arg His Ile Ser Pro Glu Tyr Tyr Ile Ser Ser Gly Asn Asn
            210                 215                 220

Val Thr Val Thr Ala Asp Asp Val Glu Glu Tyr Thr Gly Thr Ile Asn
225                 230                 235                 240

Leu Ser Gly Asn Thr Gly Asp Leu Thr Phe Asp Thr Asp Ala His Ser
                245                 250                 255

Trp Tyr Phe Asn Glu Ile Gly Ala Cys Asp Asp Gly
                260                 265

<210> SEQ ID NO 6
<211> LENGTH: 686
<212> TYPE: PRT
<213> ORGANISM: Bacillus stearothermophilus

<400> SEQUENCE: 6

Ser Ser Ser Ala Ser Val Lys Gly Asp Val Ile Tyr Gln Ile Ile Ile
1               5                   10                  15

Asp Arg Phe Tyr Asp Gly Asp Thr Thr Asn Asn Asn Pro Ala Lys Ser
            20                  25                  30

Tyr Gly Leu Tyr Asp Pro Thr Lys Ser Lys Trp Lys Met Tyr Trp Gly
            35                  40                  45

Gly Asp Leu Glu Gly Val Arg Gln Lys Leu Pro Tyr Leu Lys Gln Leu
        50                  55                  60

Gly Val Thr Thr Ile Trp Leu Ser Pro Val Leu Asp Asn Leu Asp Thr
65                  70                  75                  80
```

-continued

```
Leu Ala Gly Thr Asp Asn Thr Gly Tyr His Gly Tyr Trp Thr Arg Asp
                85                  90                  95

Phe Lys Gln Ile Glu Glu His Phe Gly Asn Trp Thr Thr Phe Asp Thr
               100                 105                 110

Leu Val Asn Asp Ala His Gln Asn Gly Ile Lys Val Ile Val Asp Phe
               115                 120                 125

Val Pro Asn His Ser Thr Pro Phe Lys Ala Asn Asp Ser Thr Phe Ala
               130                 135                 140

Glu Gly Gly Ala Leu Tyr Asn Asn Gly Thr Tyr Met Gly Asn Tyr Phe
145                 150                 155                 160

Asp Asp Ala Thr Lys Gly Tyr Phe His His Asn Gly Asp Ile Ser Asn
               165                 170                 175

Trp Asp Asp Arg Tyr Glu Ala Gln Trp Lys Asn Phe Thr Asp Pro Ala
               180                 185                 190

Gly Phe Ser Leu Ala Asp Leu Ser Gln Glu Asn Gly Thr Ile Ala Gln
               195                 200                 205

Tyr Leu Thr Asp Ala Ala Val Gln Leu Val Ala His Gly Ala Asp Gly
               210                 215                 220

Leu Arg Ile Asp Ala Val Lys His Phe Asn Ser Gly Phe Ser Lys Ser
225                 230                 235                 240

Leu Ala Asp Lys Leu Tyr Gln Lys Lys Asp Ile Phe Leu Val Gly Glu
               245                 250                 255

Trp Tyr Gly Asp Asp Pro Gly Thr Ala Asn His Leu Glu Lys Val Arg
               260                 265                 270

Tyr Ala Asn Asn Ser Gly Val Asn Val Leu Asp Phe Asp Leu Asn Thr
               275                 280                 285

Val Ile Arg Asn Val Phe Gly Thr Phe Thr Gln Thr Met Tyr Asp Leu
               290                 295                 300

Asn Asn Met Val Asn Gln Thr Gly Asn Glu Tyr Lys Tyr Lys Glu Asn
305                 310                 315                 320

Leu Ile Thr Phe Ile Asp Asn His Asp Met Ser Arg Phe Leu Ser Val
               325                 330                 335

Asn Ser Asn Lys Ala Asn Leu His Gln Ala Leu Ala Phe Ile Leu Thr
               340                 345                 350

Ser Arg Gly Thr Pro Ser Ile Tyr Tyr Gly Thr Glu Gln Tyr Met Ala
               355                 360                 365

Gly Gly Asn Asp Pro Tyr Asn Arg Gly Met Met Pro Ala Phe Asp Thr
               370                 375                 380

Thr Thr Thr Ala Phe Lys Glu Val Ser Thr Leu Ala Gly Leu Arg Arg
385                 390                 395                 400

Asn Asn Ala Ala Ile Gln Tyr Gly Thr Thr Thr Gln Arg Trp Ile Asn
               405                 410                 415

Asn Asp Val Tyr Ile Tyr Glu Arg Lys Phe Phe Asn Asp Val Val Leu
               420                 425                 430

Val Ala Ile Asn Arg Asn Thr Gln Ser Ser Tyr Ser Ile Ser Gly Leu
               435                 440                 445

Gln Thr Ala Leu Pro Asn Gly Ser Tyr Ala Asp Tyr Leu Ser Gly Leu
               450                 455                 460

Leu Gly Gly Asn Gly Ile Ser Val Ser Asn Gly Ser Val Ala Ser Phe
465                 470                 475                 480

Thr Leu Ala Pro Gly Ala Val Ser Val Trp Gln Tyr Ser Thr Ser Ala
               485                 490                 495
```

-continued

```
Ser Ala Pro Gln Ile Gly Ser Val Ala Pro Asn Met Gly Ile Pro Gly
            500             505             510

Asn Val Val Thr Ile Asp Gly Lys Gly Phe Gly Thr Thr Gln Gly Thr
        515             520             525

Val Thr Phe Gly Gly Val Thr Ala Thr Val Lys Ser Trp Thr Ser Asn
    530             535             540

Arg Ile Glu Val Tyr Val Pro Asn Met Ala Ala Gly Leu Thr Asp Val
545             550             555             560

Lys Val Thr Ala Gly Gly Val Ser Ser Asn Leu Tyr Ser Tyr Asn Ile
                565             570             575

Leu Ser Gly Thr Gln Thr Ser Val Val Phe Thr Val Lys Ser Ala Pro
            580             585             590

Pro Thr Asn Leu Gly Asp Lys Ile Tyr Leu Thr Gly Asn Ile Pro Glu
            595             600             605

Leu Gly Asn Trp Ser Thr Asp Thr Ser Gly Ala Val Asn Asn Ala Gln
    610             615             620

Gly Pro Leu Leu Ala Pro Asn Tyr Pro Asp Trp Phe Tyr Val Phe Ser
625             630             635             640

Val Pro Ala Gly Lys Thr Ile Gln Phe Lys Phe Phe Ile Lys Arg Ala
                645             650             655

Asp Gly Thr Ile Gln Trp Glu Asn Gly Ser Asn His Val Ala Thr Thr
            660             665             670

Pro Thr Gly Ala Thr Gly Asn Ile Thr Val Thr Trp Gln Asn
            675             680             685
```

PULSE AND/OR LEGUME PROTEIN-FORTIFIED DOUGHS AND BAKED GOODS COMPRISING LIPASE

CROSS-REFERENCE TO RELATED APPLICATIONS

This application is a 35 U.S.C. 371 national application of international application no. PCT/EP2020/084497 filed Dec. 3, 2020, which claims priority or the benefit under 35 U.S.C. 119 of Danish application no. PA 202000636 filed on May 29, 2020 and European application no. EP 20203541.6 filed on Oct. 23, 2020. The content of each application is fully incorporated herein by reference.

REFERENCE TO A SEQUENCE LISTING

This application contains a Sequence Listing in computer readable form, which is incorporated herein by reference.

TECHNICAL FIELD OF THE INVENTION

The present invention relates to doughs for baked edible products, wherein the usual flour has been replaced to some extent with pulse and/or legume flour which has a comparatively higher protein content, wherein the doughs also comprise at least one lipase enzyme. In particular, the invention relates to the field of manufacturing par-baked and/or baked edible products, such as bread, from said doughs.

BACKGROUND OF THE INVENTION

Commercial interest in food having a high protein and/or fiber content is increasing due to a growing interest worldwide in healthy food, and high-protein baked products is no exception. However, simply adding flour from a crop that is high in protein, such as pulse flour, i.e. flour made from the edible seeds of plants in the legume family, to a dough has a dramatic and detrimental effect on the volume of the resulting baked product, as shown herein. A technical solution to counter the negative effect on volume is highly desirable.

Par-baking is a technique where a bread or another dough product is partially (i.e. "par") baked and then typically cooled or frozen for storage. When the final baked product is wanted, the cooled or frozen par-baked product is baked at normal baking temperatures for typically 5 to 15 minutes; the resulting type of baked product is frequently referred to as "bake-off".

SUMMARY OF THE INVENTION

As mentioned above, adding flour from a crop that is high in protein, such as pulse and/or legume flour, i.e. flour made from the edible seeds of plants or from milled plants in the legume family, and/or adding protein concentrate and/or isolate from pulse and/or legume, to a dough has a dramatic and detrimental effect on the volume of the resulting baked product, as shown herein.

The inventors have now found, that it is possible to improve the volume to a surprising extent of a baked and/or par-baked product made from dough supplemented with pulse and/or legume protein, when an effective amount of at least one lipase enzyme was included in the dough. Other desirable characteristics of the baked and/or par-baked products were also improved, as shown herein.

Accordingly, in a first aspect, the invention relates to doughs for a baked- or par-baked yeast-raised products, said doughs comprising added pulse and/or legume protein and at least one added lipase enzyme, wherein at least 2% (w/w) of the total flour content is added pulse and/or legume protein.

In a second aspect, the invention relates to methods of producing a dough as defined in the first aspect for a baked or par-baked yeast-raised product, the method comprising adding pulse and/or legume protein and at least one lipase enzyme to a dough, as defined in the first aspect, wherein at least 2% (w/w) of the total flour content is added pulse and/or legume protein.

A third aspect of the invention relates to methods of producing a baked or par-baked yeast-raised product comprising pulse and/or legume protein, the method comprising the steps of:

a) providing a dough as defined in the first or second aspects; and b) baking or par-baking the yeast-raised dough, whereby the baked or par-baked yeast-raised product is produced.

A final aspect of the invention relates to uses of an enzyme composition comprising at least one lipase enzyme for maintaining or improving the volume of a baked or par-baked yeast-raised product made from dough comprising pulse and/or legume protein, wherein at least 2% (w/w) of the total flour content is added pulse and/or legume protein; preferably the at least one lipase comprises a mature lipase and/or mature phospholipase; more preferably the at least one added lipase enzyme comprises a mature lipase having amino acid sequence at least 70% identical to one or more of the sequences shown in SEQ ID NO: 1, SEQ ID NO: 2, SEQ ID NO: 3, SEQ ID NO: 4 and SEQ ID NO: 5.

FIGURES

FIG. 1 shows a photo of made from dough 1; dough 2 and dough 3 (from left to right) in Example 1.

Figure 2:
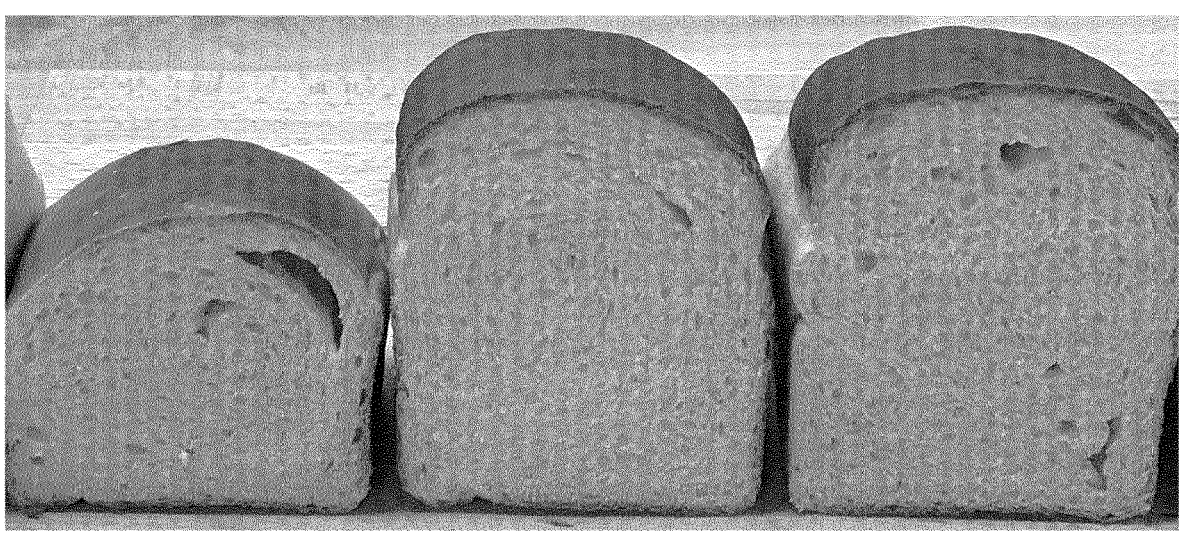

FIG. 2 shows a photo of made from dough 4; dough 5 and dough 6 (from left to right) in Example 1.

Figure 3:
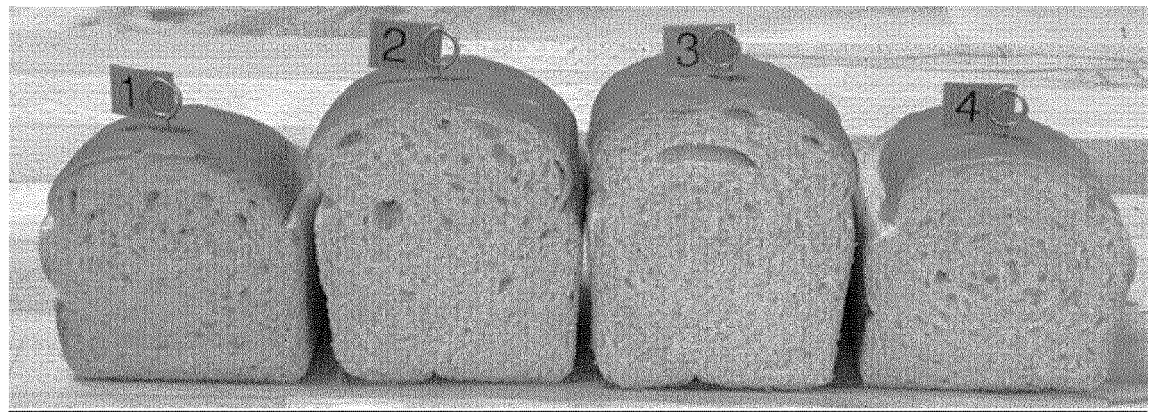

FIG. 3 shows a photo of made from dough 1; dough 2; dough 3 and dough 4 (from left to right) in Example 3.

Figure 4:
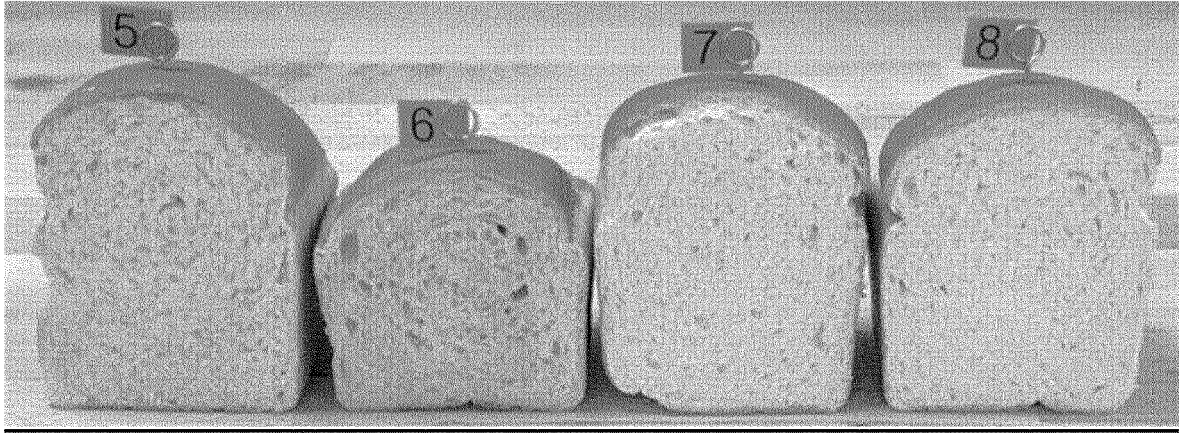

FIG. 4 shows a photo of made from dough 5; dough 6; dough 7 and dough 8 (from left to right) in Example 3.

Figure 5:
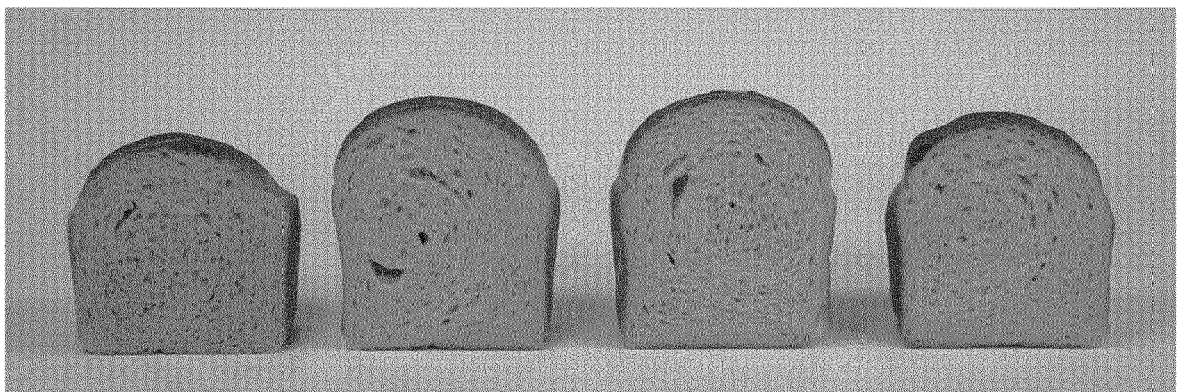

FIG. 5 shows a photo of made from dough 1; dough 3; dough 5 and dough 7 (from left to right) in Example 5.

Figure 6:
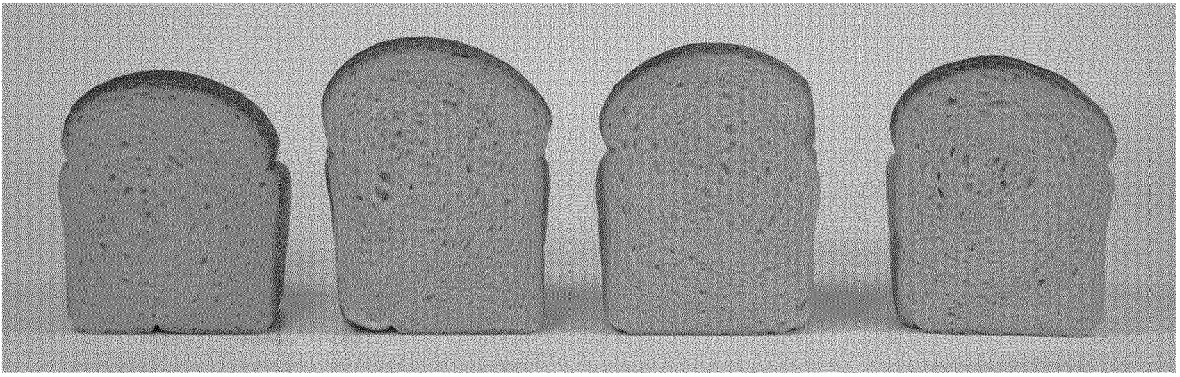

FIG. 6 shows a photo of made from dough 2; dough 4; dough 6 and dough 8 (from left to right) in Example 5.

DEFINITIONS

Legume: Legumes are plants in the Fabaceae family (or Leguminosae), or the fruit or seed of such a plant (also called a pulse, especially in the mature, dry condition). Well-known legumes include alfalfa, clover, beans, peas, chickpeas, lentils, lupins, mesquite, carob, soybeans, peanuts, and tamarind. Legumes produce a botanically unique type of fruit—a simple dry fruit that develops from a simple carpel and usually dehisces (opens along a seam) on two sides.

Pulse: The United Nations Food and Agriculture Organization (FAO) recognizes 11 types of pulses: dry beans, dry broad beans, dry peas, chickpeas, cow peas, pigeon peas, lentils, Bambara beans, vetches, lupins and pulses NES (i.e. minor pulses, including: Lablab, hyacinth bean (*Lablab purpureus*), Jack bean (*Canavalia ensiformis*), sword bean (*Canavalia gladiata*), Winged bean (*Psophocarpus tet-*

*ragonolobus*), Velvet bean, cowitch (*Mucuna pruriens* var. *utilis*), Yam bean (*Pachyrhizus erosus*).

Pulse and/or legume protein: The term 'pulse and/or legume protein' means pulse protein and/or legume protein, a desirable constituent of pulse flour and/or legume flour; the term also includes processed and/or deflavoured pulse and/or legume flour, wherein the processed flour has a higher protein content than unprocessed flour. Processed or deflavoured pulse and/or legume flour may also be termed pulse and/or legume protein concentrate and/or isolate, respectively.

Deflavoured pulse and/or legume flour or protein: In the context of the instant invention, the term 'deflavoured' means that the flour or protein component has been processed to reduce off-flavour, e.g., bitterness.

Lipase activity: Triacylglycerol lipase activity (EC 3.1.1.3), i.e., hydrolytic activity for carboxylic ester bonds in triglycerides, e.g., tributyrin.

Phospholipase activity: Phospholipase activity (A1 or A2, EC 3.1.1.32 or 3.1.1.4), i.e., hydrolytic activity towards one or both carboxylic ester bonds in phospholipids such as lecithin.

Galactolipase activity: Galactolipase activity (EC 3.1.1.26), i.e., hydrolytic activity on carboxylic ester bonds in galactolipids such as DGDG (digalactosyl diglyceride).

Fragment: The term "fragment" means a polypeptide having one or more (e.g., several) amino acids absent from the amino and/or carboxyl terminus of a mature polypeptide or domain; and wherein the fragment has xylanase enzyme activity.

Host cell: The term "host cell" means any cell type that is susceptible to transformation, transfection, transduction, or the like with a nucleic acid construct or expression vector comprising a polynucleotide of the enzyme of interest.

Mature polypeptide: The term "mature polypeptide" means a polypeptide in its final form following translation and any post-translational modifications, such as N-terminal processing, C-terminal truncation, glycosylation, phosphorylation, etc.

Sequence identity: The relatedness between two amino acid sequences is described by the parameter "sequence identity". For purposes of the present invention, the sequence identity between two amino acid sequences is determined using the Needleman-Wunsch algorithm (Needleman and Wunsch, 1970, *J. Mol. Biol.* 48: 443-453) as implemented in the Needle program of the EMBOSS package (EMBOSS: The European Molecular Biology Open Software Suite, Rice et al., 2000, *Trends Genet.* 16: 276-277), preferably version 5.0.0 or later. The parameters used are gap open penalty of 10, gap extension penalty of 0.5, and the EBLOSUM62 (EMBOSS version of BLOSUM62) substitution matrix. The output of Needle labeled "longest identity" (obtained using the -nobrief option) is used as the percent identity and is calculated as follows:

(Identical Residues×100)/(Length of Alignment−
Total Number of Gaps in Alignment).

Improved crumb firmness of the baked product: The term "improved crumb firmness" is defined herein as the property of a baked product that is more easily compressed compared to a baked product wherein the enzyme solution according to the invention is not added to the dough.

The crumb firmness is evaluated either empirically by the skilled test baker/sensory panel or measured by the use of a texture analyzer (e.g., TAXT2 or TA-XT Plus from Stable Micro Systems Ltd, Surrey, UK) as known in the art.

Improved flavor of the baked product: The term "improved flavor of the baked product" is evaluated by a trained test panel and/or chemical analysis (e.g., headspace GC-MS analysis). Improved flavor of the baked product comprises the reduction of off-flavor(s) of the baked product.

Improved anti-staling of the baked product: The term "improved anti-staling of the baked product" is defined herein as the properties of a baked product that have a reduced rate of deterioration of quality parameters, e.g., softness and/or elasticity, during storage.

Volume of the baked product: The term "volume of the baked product" is defined herein as the measure of the volume of a given loaf of bread. The volume may be determined by the rape seed displacement method.

Bread colour: The colour or whiteness of a baked or par-baked product is measured as the "Colour L*" value in a C-cell (Calibre Instruments Ltd, Warrington, UK) using the standard method for collecting images and the standard C-Cell software for data analysis.

DETAILED DESCRIPTION OF THE INVENTION

Dough According to the Invention

In a first aspect, the invention relates to doughs for a baked- or par-baked yeast-raised products, said doughs comprising added pulse and/or legume protein and at least one added lipase enzyme, wherein at least 2% (w/w) of the total flour content is added pulse and/or legume protein; preferably comprising an effective amount of at least one added lipase.

The term "added" is defined herein as adding the enzymes according to the invention to the dough, to any ingredient from which the dough is to be made, and/or to any mixture of dough ingredients from which the dough is to be made.

In other words, the enzymes according to the invention may be added in any step of the dough preparation and may be added in one, two or more steps. The enzymes are added to the ingredients of dough that may be kneaded and processed as known in the art for baked and/or par-baked products.

The term "effective amount" is defined herein as an amount of an enzyme composition according to the invention that is sufficient for providing a measurable effect on at least one property of interest of the dough and/or baked product.

The term "dough" is defined herein as a mixture of flour and other baking ingredients firm enough to knead or roll. In the context of the present invention, batters are encompassed in the term "dough"; preferably the dough of the instant invention comprises wheat flour.

In a preferred embodiment, the dough ingredients comprise wheat flour; preferably 2% (w/w) or more of the total flour content is wheat flour; preferably 4% (w/w) or more of the total flour content is wheat flour, preferably at least 6%, at least 8%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, or preferably at least 95% (w/w) of the flour is wheat flour.

The dough of the invention may comprise flour derived from any cereal grain or other sources, including wheat, emmer, spelt, einkorn, barley, rye, oat, corn, sorghum, rice, millet, amaranth, quinoa, cassava, and any combination thereof.

In a preferred embodiment of the invention, the pulse and/or legume protein is added to the dough in the form of pulse and/or legume flour, processed pulse and/or legume flour, deflavoured pulse and/or legume flour, or protein concentrate and/or isolate made essentially from pulse and/or legume flour; preferably the added pulse and/or legume protein comprises lentil protein, chickpea protein, pea protein and/or faba bean protein, or a protein concentrate and/or isolate thereof.

A preferred embodiment relates to the dough according to the first aspect, wherein at least 4% (w/w) of the total flour content is added pulse and/or legume protein, preferably at least 6% (w/w) of the total flour content is added pulse and/or legume protein, more preferably at least 8% (w/w) of the total flour content is added pulse and/or legume protein, even more preferably at least 10% (w/w) of the total flour content is added pulse and/or legume protein, most preferably, at least 12% (w/w) of the total flour content is added pulse and/or legume protein Preferably the dough of the invention also comprises gluten.

The dough may also comprise other conventional dough ingredients, e.g., proteins, such as milk powder, gluten, source of dietary fiber (such as wheat, oat bran, beta-glucan and/or inulin), and eggs (either whole eggs, egg yolks, or egg whites); an oxidant such as ascorbic acid, potassium bromate, potassium iodate, azodicarbonamide (ADA) or ammonium persulfate; an amino acid such as L-cysteine; a sugar; a salt such as sodium chloride, calcium acetate, sodium sulfate, or calcium sulfate, and/or an emulsifier.

In a preferred embodiment of the invention, the dough of the invention also comprises gluten.

The dough may comprise fat (triglyceride) such as granulated fat or oil.

The dough of the invention is normally a leavened dough or a dough to be subjected to leavening.

The dough may be leavened in various ways, such as by adding chemical leavening agents, e.g., baking powder, sodium bicarbonate, or by adding a leaven (fermenting dough), but it is preferred to leaven the dough by adding a suitable yeast culture, such as a culture of *Saccharomyces cerevisiae* (baker's yeast), e.g., a commercially available strain of *S. cerevisiae.*

A preferred embodiment relates to a dough of the first aspect, wherein the at least one added lipase enzyme comprises a lipase and/or a phospholipase, preferably a mature lipase and/or mature phospholipase. Preferably, the at least one added lipase enzyme comprises a mature lipase having amino acid sequence at least 70% identical to one or more of the sequences shown in SEQ ID NO: 1, SEQ ID NO: 2, SEQ ID NO: 3, SEQ ID NO: 4 and SEQ ID NO: 5; preferably at least 75% identical, at least 80%, 85%, 90%, 92%, 94%, 96%, 98% or preferably at least 99% identical to one or more of the sequences shown in SEQ ID NO: 1, SEQ ID NO: 2, SEQ ID NO: 3, SEQ ID NO: 4 and SEQ ID NO: 5.

Another preferred embodiment relates to a dough of the first aspect, wherein the at least one added lipase enzyme is added in an amount in the range of 0 to 100 mg enzyme protein/kg flour; preferably in the range of 0 to 50 mg enzyme protein/kg flour; more preferably in an amount in the range of 0 to 25 mg enzyme protein/kg flour; even more preferably in an amount in the range of 0 to 10 mg enzyme protein/kg flour; still more preferably in an amount in the range of 0 to 5 mg enzyme protein/kg flour; and most preferably in an amount in the range of 0 to 2.5 mg enzyme protein/kg flour.

Yet another preferred embodiment relates to a dough of the first aspect, also comprising at least one additional added enzyme, preferably at least one alpha-amylase, more preferably a mature maltogenic alpha-amylase; preferably a mature maltogenic alpha-amylase from *Bacillus stearothermophilus*; more preferably a mature maltogenic alpha-amylase having an amino acid sequence at least 70% identical to that of SEQ ID NO:6, preferably at least 75% identical, at least 80%, 85%, 90%, 92%, 94%, 96%, 98% or preferably at least 99% identical to that of SEQ ID NO:6. It Is preferred that the mature maltogenic alpha-amylase is added in an amount in the range of 0 to 10.000 MANU/kg flour; preferably in the range of 0 to 7.500 MANU/kg flour; preferably in the range of 0 to 5.000 MANU/kg flour.

Still another preferred embodiment relates to a dough of the first aspect, wherein the at least one additional added enzyme comprises a mature alpha amylase; preferably a mature fungal alpha amylase; more preferably a mature alpha amylase from *Aspergillus oryzae*; preferably the additional mature alpha-amylase is added in an amount in the range of 0 to 1.000 FAU/kg flour; preferably in the range of 0 to 500 FAU/kg flour; more preferably in the range of 0 to 100 FAU/kg flour; even more preferably in the range of 0 to 50 FAU/kg flour; and most preferably in the range of 0 to 25 FAU/kg flour.

Still another preferred embodiment relates to a dough of the first aspect, wherein the at least one additional added enzyme comprises at least one mature xylanase, preferably a GH5, a GH8 and/or a GH11 xylanase.

In a second aspect, the invention relates to methods of producing a dough as defined in the first aspect for a baked or par-baked yeast-raised product, the method comprising adding pulse and/or legume protein and at least one lipase enzyme to a dough, as defined the first aspect, wherein at least 2% (w/w) of the total flour content is added pulse and/or legume protein.

In a preferred embodiment, the method of second aspect of the invention comprises the additional step of baking or par-baking the yeast-raised dough, wherein the at least one lipase enzyme improves the volume, reduces the hardness and/or increases the elasticity of the baked yeast-raised product 1 hour after baking or 1 hour after final bake-off of the par-baked yeast-raised product, compared with a baked or par-baked yeast-raised product made from dough without the at least one lipase enzyme.

The dough may be prepared applying any conventional mixing process, such as the continuous mix process, straight-dough process, or the sponge and dough method.

A third aspect of the invention relates to methods of producing a baked or par-baked yeast-raised product comprising pulse and/or legume protein, the method comprising the steps of:

c) providing a dough as defined in the first or second aspects; and d) baking or par-baking the yeast-raised dough, whereby the baked or par-baked yeast-raised product is produced.

A preferred embodiment of the invention relates to the method of third aspect, wherein the at least one lipase enzyme improves the volume, reduces the hardness and/or increases the elasticity of the baked product 1 hour after baking or 1 hour after final bake-off of the par-baked product, compared with a baked or par-baked product made from dough without the at least one lipase enzyme.

A final aspect of the invention relates to uses of an enzyme composition comprising at least one lipase enzyme for maintaining or improving the volume of a baked or par-baked yeast-raised product made from dough comprising pulse and/or legume protein, wherein at least 2% (w/w) of the total flour content is added pulse and/or legume protein; preferably the at least one lipase comprises a mature lipase and/or mature phospholipase; more preferably the at least one added lipase enzyme comprises a mature lipase having amino acid sequence at least 70% identical to one or more of the sequences shown in SEQ ID NO: 1, SEQ ID NO: 2, SEQ ID NO: 3, SEQ ID NO: 4 and SEQ ID NO: 5, preferably at least 75% identical, at least 80%, 85%, 90%, 92%, 94%, 96%, 98% or preferably at least 99% identical to one or more of the sequences shown in SEQ ID NO: 1, SEQ ID NO: 2, SEQ ID NO: 3, SEQ ID NO: 4 and SEQ ID NO: 5.

The present invention is particularly useful for preparing yeast-raised dough, baked or par-baked products in industrialized processes in which the dough used to prepare the baked or par-baked products are prepared mechanically using automated or semi-automated equipment.

The process of preparing bread generally involves the sequential steps of dough making (with an optional proofing step), sheeting or dividing, shaping or rolling, and proofing, the dough, which steps are well known in the art. If the optional proofing step is used, preferably more flour is added and alkali may be added to neutralize acid produced or to be produced during the second proofing step. In an industrial baked production process according to the present invention, one or more of these steps is/are performed using automated or semi-automated equipment, such as:

Horizontal mixers: Roller bar mixers equipped with rotating arms, which in old models have two speed settings, typically, slow mixing at 35 rpm and fast mixing at 70 rpm, while newer models more often have variable speed settings ranging from 15-120 rpm.

Vertical mixers: Spiral mixers are typically mixers with a rotating bowl and a spiral counteracting the rotation. Some spiral mixers can be bidirectional to provide better distribution of the ingredients.

The purpose of mixing is uniform blending and hydration of dry material, kneading of the dough to form a gluten network and incorporation of air into the dough. Two-speed mixing is usually employed with both types of mixers: A slow speed to collect the dough without pushing the dough to the side of the bowl, and a fast speed to assist formation of the gluten network.

In a preferred embodiment, the dough is mixed:
a) at least 5 minutes at a slow mixing speed, preferably in the range of 5-50 rpm, more preferably in the range of 10-40 rpm; more preferably at least 10 minutes at a slow mixing speed, even more preferably at least 15 minutes a slow mixing speed; and optionally
b) the dough is subsequently mixed at a faster speed.

Sources of Phospholipase Enzymes

The phospholipase enzymes may be prokaryotic, particularly bacterial, or eukaryotic, e.g., from fungal or animal sources.

Phospholipase enzymes may be derived, e.g., from the following genera or species: *Thermomyces, T. lanuginosus* (also known as *Humicola lanuginosa*); *Humicola, H. insolens; Fusarium, F. oxysporum, F. solani, F. heterosporum; Aspergillus, A. tubigensis, A. niger, A. oryzae; Rhizomucor; Candida, C. antarctica, C. rugosa, Penicillium, P. camembertii; Rhizopus, Rhizopus oryzae; Absidia, Dictyostelium, Mucor, Neurospora, Rhizopus, R. arrhizus, R. japonicus; Sclerotinia, Trichophyton, Whetzelinia, Bacillus, Citrobacter, Enterobacter, Edwardsiella, Erwinia, Escherichia, E.*

*coli, Klebsiella, Proteus, Providencia, Salmonella, Serratia, Shigella, Streptomyces, Yersinia, Pseudomonas*, or *P. cepacia.*

The phospholipase enzyme may be produced in a suitable host cell as known in the art.

Phospholipase may also be obtained from bee or snake venom or from mammal pancreas, e.g., porcine pancreas.

WO 98/26057 discloses a lipase/phospholipase from *Fusarium oxysporum* and its use in baking.

WO 2004/099400 discloses various phospholipase enzymes and their use in baking for reduction of dough stickiness.

Suitable commercial phospholipase preparations are Lipopan F™, Lipopan Xtra™, and Lipopan Prime™ (available from Novozymes A/S).

Other available phospholipases are, e.g., Panamore™ available from DSM.

Commercial lipase preparations are, e.g., Lipopan 50 BG™ available from Novozymes A/S.

Xylanases

Xylans are hemicelluloses found in all land plants (Popper and Tuohy, Plant Physiology, 2010, 153:373-383).

The known enzymes responsible for the hydrolysis of the xylan backbone are classified into enzyme families based on sequence similarity (www.cazy.org). The enzymes with mainly endo-xylanase activity have been described in Glycoside hydrolase family (GH) 5, 8, 10, 11 and 30.

The enzymes within a family share some characteristics such as 3D fold, and they usually share the same reaction mechanism. Some GH families have narrow or mono-specific substrate specificities while other families have broad substrate specificities.

Xylanases are classified as EC 3.2.1.8 according to enzyme nomenclature.

Xylanases may be of microbial origin, e.g., derived from a bacterium or fungus, such as a strain of *Aspergillus*, in particular of *A. aculeatus, A. niger, A. awamori*, or *A. tubigensis*, from a strain of *Trichoderma*, e.g., *T. reesei*, or from a strain of *Humicola*, e.g., *H. insolens.*

In one embodiment, the dough of the first aspect comprises at least one additionally added enzyme selected from the group consisting of GH5, GH8, GH10 and GH11.

The relationship between sequences within GH5 has been clarified by defining subfamilies of related sequences (Aspeborg et al. BMC Evolutionary Biology, 2012, 12:186). Two of the subfamilies of GH5, GH5_21 and GH5_34, have been described as xylanases acting on arabinoxylan. Preferably, the dough of the first aspect comprises at least one additionally added GH5 xylanase, more preferably the GH5 xylanase is a GH5_21 or a GH5_34 xylanase, more preferably, the GH5 xylanase has an amino acid sequence identity to the polypeptide of SEQ ID NO: 1 in WO 2016/026850 of at least 70%, at least 71%, at least 72%, at least 73%, at least 74%, at least 75%, at least 76%, at least 77%, at least 78%, at least 79%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

According to the present invention, a GH8 xylanase is preferred. The GH8 xylanase may be produced in a suitable host cell as known in the art.

GH8 xylanases are described in, e.g., WO 2004/023879 and WO 2011/070101.

In a preferred embodiment, the GH8 xylanase has at least 70% sequence identity with mature GH8 shown in SEQ ID NO:2 of WO 2019/122083.

For purposes of the present invention, the polypeptide disclosed in SEQ ID NO:2 of WO 2019/122083 is used to determine the corresponding amino acid residue in another GH8 xylanase enzyme.

The amino acid sequence of another GH8 xylanase is aligned with the polypeptide disclosed in SEQ ID NO:2 of WO 2019/122083, and based on the alignment, the amino acid position number corresponding to any amino acid residue in the polypeptide disclosed in SEQ ID NO:2 of WO 2019/122083 is determined using the Needleman-Wunsch algorithm (Needleman and Wunsch, 1970, *J. Mol. Biol.* 48: 443-453) as implemented in the Needle program of the EMBOSS package (EMBOSS: The European Molecular Biology Open Software Suite, Rice et al., 2000, *Trends Genet.* 16: 276-277), preferably version 5.0.0 or later. The parameters used are gap open penalty of 10, gap extension penalty of 0.5, and the EBLOSUM62 (EMBOSS version of BLOSUM62) substitution matrix.

In one embodiment, the GH8 xylanase according to the invention has at least 70%, at least 75%, at least 80%, at least 85%, at least 90%, at least 91%, at least 92%, at least 93%, at least 94%, at least 95%, at least 96%, at least 97%, at least 98%, at least 99% or 100% sequence identity to SEQ ID NO:2 of WO 2019/122083.

The GH8 xylanase of the present invention preferably comprises or consists of the amino acids in SEQ ID NO:2 of WO 2019/122083; or is an allelic variant thereof; or is a fragment thereof having xylanase enzyme activity.

In another embodiment, the present invention relates to variants of the polypeptide of SEQ ID NO:2 of WO 2019/122083 comprising a substitution, deletion, and/or insertion at one or more (e.g., several) positions. In an embodiment, the number of amino acid substitutions, deletions and/or insertions introduced into the polypeptide of SEQ ID NO:2 of WO 2019/122083 is not more than 20, e.g., 1, 2, 3, 4, 5, 6, 7, 8, 9, 10, 11, 12, 13, 14, 15, 16, 17, 18, or 19.

The amino acid changes may be of a minor nature, that is conservative amino acid substitutions or insertions that do not significantly affect the folding and/or activity of the protein; small deletions, typically of 1-30 amino acids; small amino- or carboxyl-terminal extensions, such as an amino-terminal methionine residue; a small linker peptide of up to 20-25 residues; or a small extension that facilitates purification by changing net charge or another function, such as a poly-histidine tract, an antigenic epitope or a binding domain.

Examples of conservative substitutions are within the groups of basic amino acids (arginine, lysine and histidine), acidic amino acids (glutamic acid and aspartic acid), polar amino acids (glutamine and asparagine), hydrophobic amino acids (leucine, isoleucine and valine), aromatic amino acids (phenylalanine, tryptophan and tyrosine), and small amino acids (glycine, alanine, serine, threonine and methionine). Amino acid substitutions that do not generally alter specific activity are known in the art and are described, for example, by H. Neurath and R. L. Hill, 1979, *In, The Proteins*, Academic Press, New York. Common substitutions are Ala/Ser, Val/Ile, Asp/Glu, Thr/Ser, Ala/Gly, Ala/Thr, Ser/Asn, Ala/Val, Ser/Gly, Tyr/Phe, Ala/Pro, Lys/Arg, Asp/Asn, Leu/Ile, Leu/Val, Ala/Glu, and Asp/Gly.

Suitable commercially available xylanase preparations for use in the present invention include PANZEA BG™, PENTOPAN MONO BG™ and PENTOPAN 500 BG™ (available from Novozymes A/S), GRINDAMYL POWER-BAKE™ (available from Danisco), and BAKEZYME BXP 5000™ and BAKEZYME BXP 5001 ™ (available from DSM). Panzea is a GH8 xylanase, and Pentopan is a GH11 xylanase.

Additional Enzymes

Optionally, one or more additional enzymes such as aminopeptidase, amylase, alpha-amylase, beta-amylase, carboxypeptidase, catalase, chitinase, cutinase, glycosyltransferase, deoxyribonuclease, esterase, galactanase, glucan 1,4-alpha-maltotetrahydrolase, glucanase, alpha-galactosidase, beta-galactosidase, glucoamylase, alpha-glucosidase, beta-glucosidase, haloperoxidase, invertase, laccase, mannanase, mannosidase, oxidase, peptidoglutaminase, peroxidase, phytase, polyphenoloxidase, proteolytic enzyme, ribonuclease, and/or transglutaminase may be used together with the phospholipase enzyme and the GH8 xylanase according to the invention.

Preferably, an alpha-amylase is added together with the phospholipase enzyme and the GH8 xylanase according to the invention.

The alpha-amylase may be fungal or bacterial, e.g., an alpha-amylase from *Bacillus*, e.g., *B. licheniformis* or *B. amyloliquefaciens*, or a fungal alpha-amylase, e.g., from *A. oryzae*.

Suitable commercial fungal alpha-amylase compositions include, e.g., BAKEZYME P 300 (available from DSM) and FUNGAMYL 2500 SG, FUNGAMYL 4000 BG, FUNGAMYL 800 L, FUNGAMYL ULTRA BG and FUNGAMYL ULTRA SG (available from Novozymes A/S).

A protease may also be added; the protease may be from *Bacillus*, e.g., *B. amyloliquefaciens* or from *Thermus aquaticus*.

The glucoamylase include glucoamylases having a sequence identity of at least 50%, at least 60%, at least 65%, at least 70%, at least 75%, at least 80%, at least 85%, at least 90%, at least 95%, at least 96%, at least 97%, at least 98%, or at least 99% to the amino acid sequence of the *A. niger* G1 or G2 glucoamylase (Boel et al. (1984), EMBO J. 3 (5), p. 1097-1102), the *A. awamori* glucoamylase disclosed in WO 84/02921, or the *A. oryzae* glucoamylase (Agric. Biol. Chem. (1991), 55 (4), p. 941-949).

The glucose oxidase may be a fungal glucose oxidase, in particular an *Aspergillus niger* glucose oxidase (such as GLUZYME™, available from Novozymes A/S).

Enzyme Preparation

The enzymes according to the present invention are preferably prepared in the form of a granulate or agglomerated powder. They preferably have a narrow particle size distribution with more than 95% (by weight) of the particles in the range from 25 to 500 μm.

Granulates and agglomerated powders may be prepared by conventional methods, e.g., by spraying the enzyme onto a carrier in a fluid-bed granulator. The carrier may consist of particulate cores having a suitable particle size. The carrier may be soluble or insoluble, e.g., a salt (such as NaCl or sodium sulfate), a sugar (such as sucrose or lactose), a sugar alcohol (such as sorbitol), starch, rice, corn grits, or soy.

The enzymes may also be prepared in liquid forms.

Par-Baked Products

Par-baked is a technique in which a bread or a dough product is partially baked and then typically rapidly cooled/frozen for storage.

The raw dough is baked normally, but halted at about approximately 80% of the normal cooking time, where after it is rapidly cooled.

A par-baked dough product bread can be transported easily, and stored until needed. Par-baked dough products are kept in sealed containers that prevent moisture loss. They are may be stored at room temperature; or stored in a fridge, or stored in a freezer.

The freezing step may lead to ice crystal formation and subsequent damage to the starch granules and amylose leakage. It is therefore likely that the amount of leaked amylose and unbound water is higher prior to the second bake-off than in a bread baked without a freezing step. These are two parameters known to increase the crumb firming rate.

When the final dough product is desired, a par-baked product is "finished off" by baking it at normal temperatures for an additional time, typically 5 to 15 minutes. The exact time must be determined by testing, as the time varies depending on the product.

Accordingly, the par-baked product is manufactured by the following steps:

a) the dough is made into a product,
b) the product is baked,
c) the product is stored, and
d) the product is re-baked to a par-baked product.

The product may be stored at ambient/room temperature, or the product may be stored a low temperature, which means that it will normally be stored at a temperature below 5 degrees Celsius. In one embodiment, the product will be stored in a freezer.

Bread Improvers and Patisserie Mixes or Premixes

The phospholipase enzyme and the GH8 xylanase of the present invention may advantageously be part of a bread improver or a patisserie mix or a premix.

"Bread improvers" (also referred to as "dough conditioners" or "dough improvers" or "improving agents" or "flour treatment agents") are typically added to the dough in order to improve texture, structure, volume, flavour and freshness of the baked product as well as to improve machinability and stability of the dough.

Typically, a bread improver may comprise one or more enzyme(s), one or more oxidizing or reducing agent(s) (such as, e.g., ascorbic acid, glutathione, cysteine), one or more emulsifier(s) (such as, e.g., diacetyl tartaric acid esters of monoglycerides (DATEM), sodium stearoyl lactylate (SSL), calcium stearoyl lactylate (CSL), glycerol monostearate (GMS), rhamnolipids, lecithins, sucroesters, bile salts), one or more lipid material(s) (such as, e.g., butter, oil, shortening), one or more sugar(s), one or more flours or flour fraction(s), one or more vitamin(s) (such as, e.g., pantothenic acid and vitamin E), one or more gum(s), and/or one or more source(s) of fibre (such as, e.g., oat fibre).

Cake (patisserie) mixes typically comprise all the ingredients of a cake recipe with the exception of water, fat (oil, butter, margarine), and eggs. Eggs may be added in a cake (patisserie) mix in a powder form. Cake (patisserie) premixes are typically cake mixes where all or part of the flour and sugar has been removed.

Par-Baked Products

The process of the invention may be used for any kind of par-baked product prepared from dough, in particular of a soft character, either of a white, light or dark type.

Examples are bread (in particular white, whole-meal or rye bread), typically in the form of loaves or rolls, bread, flat bread, pita bread, tortillas, cakes, pancakes, biscuits, wafers, cookies, pie crusts, pizza, and the like.

Chorleywood Bread Process

Preferably, the baked or par-baked products of the invention are made according to the Chorleywood Bread Process (CBP) lidded pans method as follows:

1. Scaling of ingredients
2. Addition of all ingredient except water and enzymes into the mixer bowl.
3. Temperature adjustment (in order to reach the target temperature of the final dough), scaling and addition of water into mixer bowl
4. Addition of enzymes according to Table 10, a dummy dough was run before in order heat up the equipment and ensure that all doughs were treated in the same way.
5. The ingredients were mixed into dough using a High speed mixer pressure vacuum K5 to an energy input of 11 watt/kg dough, at a mixing speed of 410 rpm. A 0.5 bar vacuum was added after 30% of the mixing energy input had been reached.
6. The dough was taken from the mixer bowl and the temperature was determined (Target temperature of the final dough 30+/−0.5° C.).
7. The dough was given 5 min bench-time under plastic cover and a dough evaluation was performed
8. The dough was scaled (700 g/bread) and rounded by hand.
9. The dough was given 7 min bench-time under plastic cover.
10. The doughs for bread were shaped into a cylinder using a Winkler LR 67 sheeter, the dough cylinder were cut horizontally into four equal pieces all 4 pieces are turned 90° along the vertical axis, all four pieces were put together and transferred to pans which were put on baking sheet.
11. The doughs were proofed at 40° C., 80-90% rh for 60 min. The doughs were baked into bread for 24 min at 230° C.
12. The bread was taken out of the pans after baking and put on a baking sheet.
13. The bread was allowed to cool down for 2 hours and packed sealed plastic bags in N2 and $CO_2$ atmosphere.
14. The bread was evaluated regarding volume, external and internal bread evaluation.

The dough properties were evaluated after 5 min bench time using the parameters, definitions and evaluation methods as described in Table 1 below. A scale between 0-10 was used where the control dough (dough 1 with only background enzymes added) was given the score 5 and the other doughs were evaluated relative to the control. The further away from the control the dough was judged to be, the higher/lower score the dough was given.

TABLE 1

| Dough Evaluation | | | |
| --- | --- | --- | --- |
| Parameters | Definition | Evaluation method | Scale |
| Stickiness | The degree to which a dough adheres to one's hands or other surfaces | A 3 cm deep cut is made in the middle of the dough. Stickiness is | Less sticky 0-4 Control 5 More sticky 6-10 |

TABLE 1-continued

| Dough Evaluation | | | |
|---|---|---|---|
| Parameters | Definition | Evaluation method | Scale |
| | | measured in this cut by evaluating how much the dough sticks to the hand when the whole palm of the hand is pushed down and withdrawn. | |
| Softness | The degree to, or ease with, which a dough will compress or resist compression | Is measured by squeezing and feeling the dough | Less soft 0-4<br>Control 5<br>More soft 6-10 |
| Elasticity | The ability of a dough to resist stretching as well as to return to its original size and shape when the force is removed | The dough is pulled gently to feel the resistance/the elasticity. | Less elastic 0-4<br>Control 5<br>More elastic 6-10 |
| Extensibility | The degree to which a dough can be stretched without tearing | The dough is gently stretched to form a "window" to feel the extensibility | Less extensible 0-4<br>Control 5<br>More extensible 6-10 |

Texture

Bread texture properties are mainly characterized by firmness (the same as "hardness" and the opposite of "softness") and the elasticity of the baked product. Firmness and elasticity can be measured using a texture profile analyzer such as from TA-XT plus texture analyzer from Stable Micro Systems, UK. A standard method for measuring firmness and elasticity is based on force-deformation of the baked product. A force-deformation of the baked products may be performed with a 40 mm diameter cylindrical probe. The force on the cylindrical probe is recoded as it is pressed down 7 mm into a 25 mm thick bread slice at a deformation speed of 1 mm/second. The probe is then kept in this position for 30 seconds while the force is recorded and then probe returns to its original position.

Softness (in grams) is defined as the force needed to compress a probe 6.25 mm into a bread crumb slice of 25 mm thickness.

Elasticity (in %) is defined as the force recoded after 30 seconds compression at 7 mm (Force at time=37s) divided by the force needed to press the probe 7 mm into the crumb (Force at time=7s) times 100.

EXAMPLES

Maltogenic Alpha-Amylase Assay

The activity of a maltogenic alpha-amylase may be determined using an activity assay such as the MANU method. One MANU (Maltogenic Amylase Novo Unit) is defined as the amount of enzyme required to release one micro-mole of maltose per minute at a concentration of 10 mg of maltotriose substrate per ml in 0.1 M citrate buffer at pH 5.0, 37° C. for 30 minutes.

Fungal Alpha-Amylase Assay

The activity of fungal alpha-amylase may be determined using an activity assay such as the FAU method. One Fungal Alpha-Amylase Unit (FAU) is defined as the amount of enzyme, which breaks down 5.26 g starch (Merck Amylum solubile Erg. B.6, Batch 9947275) per hour based upon the following standard conditions:

Substrate Soluble starch

Temperature 37° C.

pH 4.7

Reaction time 7-20 minutes

Example 1. Lipase Addition to Dough with Pea Protein Concentrate

Baked breads were prepared using a straight dough procedure according to below recipe and process conditions. All chemicals applied were food grade. Fungal alpha-amylase (e.g. Fungamyl 4000 SG); maltogenic alpha-amylase (e.g. Novamyl 10000 BG) available from Novozymes A/S and a lipase having the amino acid sequence shown in SEQ ID NO:1 were tested in concentrations according to the experimental design. Ingredients were added according to baker's percentage or ppm calculated based on the total amount of refined white flour and pea protein.

TABLE 2

| Dough Recipe | |
|---|---|
| Ingredient | Amount (on flour + pea protein basis) |
| Flour:<br>Pelikaan (Refined white flour from Meneba, NL)<br>Pea Protein 55 (Concentrate from AGT Food and Ingredients, Canada, containing 55% protein) | 85% Pelikaan and 15% Pea Protein 55<br>Or<br>75% Pelikaan and 25% Pea Protein 55<br>As stated in experimental design |
| Tap water | 58% |
| Yeast (fresh) | 4% |

TABLE 2-continued

| Dough Recipe | |
| --- | --- |
| Ingredient | Amount (on flour + pea protein basis) |
| Sucrose | 1.5% |
| Salt | 1.5% |
| Ascorbic acid | 24 ppm |
| Calcium Propionate | 0.3% |
| Fungamyl 4000 SG (4000 FAU/g) | 16 FAU/kg flour |
| Novamyl 10000 BG (10000 MANU/g) | 0 or 2500 MANU/kg flour as stated in experimental design |
| Lipase (SEQ ID NO: 1) | 0 or 0.76 mg enzyme protein/kg flour as stated in experimental design |

Procedure:

All ingredients were weighed out. Salt, sucrose, yeast, ascorbic acid, calcium propionate and enzyme were added to the mixing bowl. Tap water was weighed out, and the temperature adjusted with ice (to approx. 9-10° C., to reach a dough temperature of 27° C. after mixing) and added to the mixing bowl. 3000 g flour+pea protein (ratio as stated in experimental design) were added to the mixing bowl and all ingredients were mixed for 3 min at 17 rpm and 6 min at 35 rpm using Spiral mixer (DIOSNA Dierks & Söhne GmbH, DE) to reach optimal dough conditions. The mixed dough was taken out of the mixing bowl and the dough temperature was controlled. The dough was divided into pieces of 350 g each, rounded by hand, where after they rested for 15 min at room temperature covered by plastic. The rested dough pieces were shaped into breads in a sheeter (MO671 MPB-001, Glimek, SE) and transferred to greased 1200 ml pans (Top 160×110×85 mm). The breads were proofed at 32° C. at 86% humidity for 60 min. The proofed breads were baked for 25 min in a deck oven (Piccolo, Wachtel, DE) at 210° C. without steam. The breads were taken out of the pans and allowed to cool to room temperature. Breads for texture analysis were packed in nitrogen in sealed plastic bags and stored at room temperature.

Volume of breads were determined as described under volume determination. Bread crumb characteristics (brightness and number of cells) were evaluated using C-cell as described under C-cell. Bread crumb hardness and elasticity was determined day 1, 3 and 7 after baking as described under Texture analyzer.

Volume Determination:

The volume and specific volume were measured using the Volscan profiler 600 (Stable microsystems, UK) running on the Volscan profiler software. Each bread was mounted in the machine. The weight of each loaf was automatically determined with the build-in balance of the Volscan instrument. The volume of each loaf was calculated from a 3D image created by the instrument when each loaf of bread was rotated with a speed of 1.5 revolutions per second while it was scanned with a laser beam taking 3 mm vertical steps per revolution. Specific volume was calculated for each bread according to the following formula:

$$\text{Specific volume (ml/g)} = \text{volume (ml)/weight (g)}$$

The reported value was the average of 3 breads from the same dough.

C-Cell

Crumb color (L*) was measured on 3×2 cm thick slices from the middle of 2 breads which were scanned in a C-Cell (Calibre Instruments Ltd, Warrington, UK) using the standard method for collecting images and the standard C-Cell software for data analysis.

Texture Analyzer

Crumb hardness and elasticity were determined using a TA.XT plus Texture Analyzer (Stable Micro Systems, Surrey, UK). 3×2 cm thick slices from 2 bread from each dough was tested by compressing a bread slice 40% of the original height at a speed of 1 mm/s using a cylindrical probe (SMS P/40). Crumb hardness was measured in grams at 25% compression. Elasticity was determined as the force the sample push back after compression to 40% for 30 seconds divided by the initial force at 40% compression and given as %.

TABLE 3

| Experimental design | | | | | | |
| --- | --- | --- | --- | --- | --- | --- |
| Dough number | Dough 1 | Dough 2 | Dough 3 | Dough 4 | Dough 5 | Dough 6 |
| Ratio of Pelikaan (% of flour) | 85 | 85 | 85 | 75 | 75 | 75 |
| Ratio of Pea Concentrate 55 (% of flour) | 15 | 15 | 15 | 25 | 25 | 25 |
| Fungamyl 4000 SG (FAU/kg flour) | 16 | 16 | 16 | 16 | 16 | 16 |
| Novamyl 10000 BG (MANU/kg flour) | 0 | 0 | 2500 | 0 | 0 | 2500 |
| Lipase of SEQ ID NO: 1 (mg enzyme protein/kg flour) | 0 | 0.76 | 0.76 | 0 | 0.76 | 0.76 |

TABLE 4

| Parameter | Dough 1 | Dough 2 | Dough 3 | Dough 4 | Dough 5 | Dough 6 |
|---|---|---|---|---|---|---|
| Volume (ml) | 1004.0 | 1381.3 | 1416.3 | 839.4 | 1305.8 | 1346.6 |
| Specific Volume (ml/g) | 3.18 | 4.48 | 4.54 | 2.61 | 4.08 | 4.18 |
| Colour L* | 54.1 | 58.5 | 58.4 | 51.7 | 55.7 | 55.6 |
| Day 1 Hardness (g) | 806.9 | 375.0 | 245.9 | 1946.3 | 514.0 | 408.9 |
| Day 1 Elasticity (%) | 58.9 | 58.5 | 60.1 | 56.8 | 56.2 | 57.6 |
| Day 3 Hardness (g) | 1317.7 | 588.1 | 349.4 | 2923.5 | 943.7 | 567.1 |
| Day 3 Elasticity (%) | 57.7 | 58.9 | 62.4 | 54.9 | 56.6 | 60.2 |
| Day 7 Hardness (g) | 1693.4 | 788.9 | 393.5 | 3773.7 | 861.8 | 547.2 |
| Day 7 Elasticity (%) | 53.7 | 56.9 | 61.9 | 52.6 | 55.4 | 60.2 |

Conclusion

Addition of lipase SEQ ID1 surprisingly increased bread volume both 15 and 25% of the flour was replaced with Pea protein 55. In addition, bread hardness was significantly reduced, and elasticity increased. The reduction in bread hardness and improvement in elasticity could be further enhanced by addition of a maltogenic alpha-amylase (Novamyl 10000 BG) in combination with the lipase. Crumb color was increased and appeared whiter when lipase SEQ ID NO: 1 was added.

Example 2. Dose Response of Lipase in Dough with Pea Protein Concentrate

Breads were prepared using a straight dough procedure according to below recipe and process conditions. All chemicals applied were food grade. Fungal alpha-amylase (e.g. Fungamyl 4000 SG); maltogenic alpha-amylase (e.g. Novamyl 10000 BG) available from Novozymes A/S and a lipase having the amino acid sequence shown in SEQ ID NO:1 were tested in concentrations according to the experimental design. Ingredients were added according to baker's percentage or ppm calculated based on the total amount of refined white flour and pea protein.

temperature adjusted with ice (to approx. 9-10° C., to reach a dough temperature of 27° C. after mixing) and added to the mixing bowl. 2500 g flour+pea protein (ratio as stated in experimental design) were added to the mixing bowl and all ingredients were mixed for 3 min at 17 rpm and 6 min at 35 rpm using Spiral mixer (DIOSNA Dierks & Söhne GmbH, DE) to reach optimal dough conditions. The mixed dough was taken out of the mixing bowl and the dough temperature was measured.

The dough was divided into pieces of 350 g each, rounded by hand, where after they rested for 15 min at room temperature covered by plastic. The rested dough pieces were shaped into breads in a sheeter (MO671 MPB-001, Glimek, SE) and transferred to greased 1200 ml pans (Top 160×110×85 mm). The breads were proofed at 32° C. at 86% humidity for 60 min. The proofed breads were baked for 25 min in a deck oven (Piccolo, Wachtel, DE) at 210° C. without steam. The breads were taken out of the pans and allowed to cool to room temperature. Breads for texture analysis were packed in nitrogen in sealed plastic bags and stored at room temperature.

The volumes of the baked breads were determined as described under volume determination. Bread crumb char-

TABLE 5

| Dough Recipe | |
|---|---|
| Ingredient | Amount (on flour + pea protein basis) |
| Flour: | 75% Pelikaan and 25% Pea Protein 55 |
| Pelikaan (Refined white flour from Meneba, NL) | As stated in experimental design |
| Pea Protein 55 (Concentrate from AGT Food and Ingredients, Canada) | |
| Tap water | 58% |
| Yeast (fresh) | 4% |
| Sucrose | 1.5% |
| Salt | 1.5% |
| Ascorbic acid | 100 ppm |
| Calcium Propionate | 0.3% |
| Fungamyl 4000 SG (4000 FAU/g) | 16 FAU/kg flour |
| Novamyl 10000 BG (10000 MANU/g) | 0; 500; 1000 or 2500 MANU/kg flour as stated in experimental design |
| Lipase of SEQ ID NO: 1 | 0; 0.38; 0.76 or 1.15 mg enzyme protein/kg flour as stated in experimental design |

Procedure:

All ingredients were weighed out. Salt, sucrose, yeast, ascorbic acid, calcium propionate and enzyme were added to the mixing bowl. Tap water was weighed out, and the acteristics (brightness and number of cells) were evaluated using C-cell as described under C-cell. Bread crumb hardness and elasticity was determined day 1, 4 and 6 after baking as described under Texture analyzer.

TABLE 6

| Experimental design | | | | | | | |
|---|---|---|---|---|---|---|---|
| Dough number | 1 | 2 | 3 | 4 | 5 | 6 | 7 |
| Ratio of Pelikaan (% of flour) | 75 | 75 | 75 | 75 | 75 | 75 | 75 |
| Ratio of Pea Protein 55 (% of flour) | 25 | 25 | 25 | 25 | 25 | 25 | 25 |
| Fungamyl 4000 SG FAU/kg flour | 16 | 16 | 16 | 16 | 16 | 16 | 16 |
| Novamyl 10000 BG MANU/kg flour | 0 | 0 | 0 | 0 | 500 | 1000 | 2500 |
| Lipase of SEQ ID NO: 1 (mg enzyme protein/kg flour) | 0 | 0.38 | 0.76 | 1.15 | 0.76 | 0.76 | 0.76 |

Volume Determination:

The volume and specific volume were measured using the Volscan profiler 600 (Stable microsystems, UK) running on the Volscan profiler software. Each bread was mounted in the machine. The weight of each loaf was automatically determined with the build-in balance of the Volscan instrument. The volume of each loaf was calculated from a 3D image created by the instrument when each loaf of bread was rotated with a speed of 1.5 revolutions per second while it was scanned with a laser beam taking 3 mm vertical steps per revolution. Specific volume was calculated for each bread according to the following formula:

$$\text{Specific volume (ml/g)} = \text{volume (ml)}/\text{weight (g)}$$

The reported value was the average of 3 breads from the same dough.

C-Cell

Crumb color (L*) was measured on 3×2 cm thick slices from the middle of 2 breads which were scanned in a C-Cell (Calibre Instruments Ltd, Warrington, UK) using the standard method for collecting images and the standard C-Cell software for data analysis.

Texture Analyzer

Crumb hardness and elasticity were determined using a TA.XT plus Texture Analyzer (Stable Micro Systems, Surrey, UK). 3×2 cm thick slices from 2 bread from each dough was tested by compressing a bread slice 40% of the original height at a speed of 1 mm/s using a cylindrical probe (SMS P/40). Crumb hardness was measured in grams at 25% compression. Elasticity was determined as the force the sample push back after compression to 40% for 30 seconds divided by the initial force at 40% compression and given as %.

TABLE 7

| Results | | | | | | | |
|---|---|---|---|---|---|---|---|
| Dough number | 1 | 2 | 3 | 4 | 5 | 6 | 7 |
| Volume (ml) | 820.0 | 1201.7 | 1273.3 | 1279.3 | 1321.2 | 1300.9 | 1264.9 |
| Specific Volume (ml/g) | 2.56 | 3.81 | 4.04 | 4.05 | 4.15 | 4.09 | 3.97 |
| Colour L* | 50.7 | 55.3 | 55.5 | 56.4 | 57.5 | 56.6 | 55.3 |
| Day 1 Hardness (g) | 2368.3 | 878.7 | 757.6 | 840.8 | 628.4 | 629.6 | 601.2 |
| Day 1 Elasticity (%) | 56.1 | 58.1 | 57.3 | 57.4 | 59.5 | 59.7 | 59.5 |
| Day 4 Hardness (g) | 3146.5 | 1073.2 | 1067.8 | 1020.1 | 720.2 | 632.1 | 607.2 |
| Day 4 Elasticity (%) | 51.8 | 54.7 | 53.9 | 54.8 | 57.9 | 58.7 | 59.7 |
| Day 6 Hardness (g) | 3479.9 | 1297.2 | 1141.9 | 1031.0 | 907.4 | 710.8 | 699.2 |
| Day 6 Elasticity (%) | 50.2 | 52.9 | 52.1 | 53.9 | 57.1 | 58.0 | 59.4 |

Conclusion

Addition of increasing amount of the lipase of SEQ ID NO:1 resulted in a concomitantly higher volume and specific volume. Bread hardness was also reduced at increasing dose level of Lipase SEQ ID NO:1 which was most pronounced after 6 days of storage. A maltogenic alpha-amylase (Novamyl 10.000 BG) was tested at three dose levels in combination with 0.76 mg enzyme protein/kg flour of SEQ ID NO:1. Improvement in texture was observed at increasing level of Novamyl 10.000 BG as reduced hardness and increased elasticity.

Example 3. Lipase Addition to Dough with Faba Bean Concentrate

Baked breads were prepared using a straight dough procedure according to below recipe and process conditions. All chemicals applied were food grade. Fungal alpha-amylase (e.g. Fungamyl 4000 SG); maltogenic alpha-amylase (e.g. Novamyl 10000 BG) available from Novozymes A/S and a lipase having the amino acid sequence shown in SEQ ID NO:1 were tested in concentrations according to the experimental design. All Ingredients were added according to baker's percentage or ppm calculated based on the total amount of refined white flour and faba protein.

TABLE 8

| Dough Recipe | |
| --- | --- |
| Ingredient | Amount (on flour + Faba protein basis) |
| Flour:<br>Pelikaan (Refined white flour from Meneba, NL)<br>Faba Protein 60 (Concentrate from AGT Food<br>and Ingredients, Canada, containing 60%<br>protein) | 75% Pelikaan and 25% Faba Protein 55 |
| Tap water | 58% |
| Yeast (fresh) | 4% |
| Sucrose | 1.5% |
| Salt | 1.5% |
| Ascorbic acid | 100 ppm |
| Calcium Propionate | 0.3% |
| Fungamyl 4000 BG (4000 FAU/g) | 16 FAU/kg flour |
| Novamyl 10000 BG (10000 MANU/g) | 0 or 500 or 1000 MANU/kg flour as stated in experimental design |
| Lipase of SEQ ID NO: 1 | 0 or 0.76 mg or 1.15 mg enzyme protein/kg flour |

Procedure:

All ingredients were weighed out. Salt, sucrose, yeast, ascorbic acid, calcium propionate and enzyme were added to the mixing bowl. Tap water was weighed out, and the temperature adjusted with ice (to approx. 9-10° C., to reach a dough temperature of 27° C. after mixing) and added to the mixing bowl. 2000 g flour+faba protein were added to the mixing bowl and all ingredients were mixed for 3 min at 17 rpm and 6 min at 35 rpm using Spiral mixer (DIOSNA Dierks & Söhne GmbH, DE) to reach optimal dough conditions. The mixed dough was taken out of the mixing bowl and the dough temperature was controlled.

The dough was divided into pieces of 350 g each, rounded by hand, where after they rested for 15 min at room temperature covered by plastic. The rested dough pieces were shaped into breads in a sheeter (MO671 MPB-001, Glimek, SE) and transferred to greased 1200 ml pans (Top 160×110×85 mm). The breads were proofed at 32° C. at 86% humidity for 60 min. The proofed breads were baked for 20 min in a deck oven (Piccolo, Wachtel, DE) at 200° C. without steam. The breads were taken out of the pans and allowed to cool to room temperature. Breads for texture analysis were packed in nitrogen in sealed plastic bags and stored at room temperature.

The volumes of the baked breads were determined as described under volume determination. Bread crumb characteristics (brightness and number of cells) were evaluated using C-cell as described under C-cell. Bread crumb hardness and elasticity was determined day 1, 3 and 7 after baking as described under Texture analyzer.

Volume Determination:

The volume and specific volume were measured using the Volscan profiler 600 (Stable microsystems, UK) running on the Volscan profiler software. Each bread was mounted in the machine. The weight of each loaf was automatically determined with the build-in balance of the Volscan instrument. The volume of each loaf was calculated from a 3D image created by the instrument when each loaf of bread was rotated with a speed of 1.5 revolutions per second while it was scanned with a laser beam taking 3 mm vertical steps per revolution. Specific volume was calculated for each bread according to the following formula:

$$\text{Specific volume (ml/g)} = \text{volume (ml)/weight (g)}$$

The reported value was the average of 4 breads from the same dough.

C-Cell

Crumb color (L*) was measured on 3×2 cm thick slices from the middle of 2 breads which were scanned in a C-Cell (Calibre Instruments Ltd, Warrington, UK) using the standard method for collecting images and the standard C-Cell software for data analysis.

Texture Analyzer

Crumb hardness and elasticity were determined using a TA.XT plus Texture Analyzer (Stable Micro Systems, Surrey, UK). 3×2 cm thick slices from 2 bread from each dough was tested by compressing a bread slice 40% of the original height at a speed of 1 mm/s using a cylindrical probe (SMS P/40). Crumb hardness was measured in grams at 25% compression. Elasticity was determined as the force the

TABLE 9

| Experimental design | | | | | | | | |
| --- | --- | --- | --- | --- | --- | --- | --- | --- |
| Dough number | 1 | 2 | 3 | 4 | 5 | 6 | 7 | 8 |
| Fungamyl 4000 SG(FAU/kg flour) | 16 | 16 | 16 | 16 | 16 | 16 | 16 | 16 |
| Novamyl 10000 BG (MANU/kg flour) | 0 | 0 | 0 | 500 | 500 | 1000 | 1000 | 1000 |
| Lipase of SEQ ID NO: 1 (mg enzyme protein/kg flour) | 0 | 0.76 | 1.15 | 0 | 0.76 | 0 | 0.76 | 1.15 | sample push back after compression to 40% for 30 seconds divided by the initial force at 40% compression and given as %.

two different lipases having the amino acid sequences shown in SEQ ID NO:1 and SEQ ID NO:2, respectively, were tested in concentrations according to the experimental

TABLE 10

| | | | | Results | | | | |
|---|---|---|---|---|---|---|---|---|
| Dough number | 1 | 2 | 3 | 4 | 5 | 6 | 7 | 8 |
| Volume (ml) | 1102.9 | 1384.8 | 1377.3 | 1066.6 | 1408.7 | 1075.7 | 1429.1 | 1423.2 |
| Specific volume (ml/g) | 3.43 | 4.41 | 4.34 | 3.32 | 4.40 | 3.30 | 4.49 | 4.43 |
| Colour L* | 50 | 55 | 55 | 48 | 55 | 50 | 56 | 55 |
| Day 1 Hardness (g) | 960.9 | 396.8 | 407.8 | 983.0 | 320.1 | 812.0 | 319.8 | 312.8 |
| Day 1 Elasticity (%) | 57.2 | 55.9 | 54.1 | 57.8 | 56.5 | 58.2 | 57.3 | 56.1 |
| Day 3 Hardness (g) | 1491 | 482 | 500 | 1297 | 410 | 912 | 380 | 321 |
| Day 3 Elasticity (%) | 53.2 | 53.8 | 53.7 | 56.8 | 55.8 | 57.8 | 57.6 | 55.6 |
| Day 7 Hardness (g) | 1677 | 719 | 636 | 1465 | 459 | 1130 | 456 | 397 |
| Day 7 Elasticity (%) | 50.3 | 52.1 | 50.8 | 55.1 | 54.1 | 56.5 | 56.0 | 55.2 |

Conclusion

Addition of the lipase (SEQ ID NO:1) surprisingly increased bread volume even when 25% of the flour had design. All ingredients were added according to baker's percentage or ppm calculated based on the total amount of refined white flour and pea protein.

TABLE 11

| Dough Recipe | |
|---|---|
| Ingredient | Amount (on flour + pea protein basis) |
| Flour: | 75% Pelikaan and 25% Pea Protein Isolate |
| Pelikaan (Refined white flour from Meneba, NL) | 85 |
| Pea Protein Isolate 85 (Isolate from AGT Food and Ingredients, Canada; containing 85% protein) | |
| Tap water | 77% |
| Yeast (fresh) | 4% |
| Sucrose | 1.5% |
| Salt | 1.5% |
| Ascorbic acid | 100 ppm |
| Calcium Propionate | 0.3% |
| Fungamyl 4000 BG (4000 FAU/g) | 16 FAU/kg flour |
| Novamyl 10000 BG (10000 MANU/g) | 0 or 2500 MANU/kg flour as stated in experimental design |
| Lipase of SEQ ID NO: 1 | 0 or 0.95 mg enzyme protein/kg flour |
| Lipase of SEQ ID NO: 2 | 0 or 0.68 mg enzyme protein/kg flour | been replaced with Faba protein 60. Results are also shown in FIGS. 3 and 8 showing sliced cross-sections of the baked breads from doughs 1-8 in table 3. In addition, bread hardness was significantly reduced, and elasticity was increased. The reduction in bread hardness and improvement in elasticity could be further enhanced by addition of a maltogenic alpha-amylase (Novamyl 10000 BG) in combination with the lipase. Crumb color was increased and also appeared whiter when the lipase was added.

Example 4. Addition of Different Lipases to Dough with Pea Protein Isolate

Baked breads were prepared using a straight dough procedure according to below recipe and process conditions. All chemicals applied were food grade. Fungal alpha-amylase (e.g. Fungamyl 4000 SG); maltogenic alpha-amylase (e.g. Novamyl 10000 BG) available from Novozymes A/S and Procedure:

All ingredients were weighed out. Salt, sucrose, yeast, ascorbic acid, calcium propionate and enzyme were added to the mixing bowl. Tap water was weighed out, and the temperature adjusted with ice (to approx. 9-10° C., to reach a dough temperature of 27° C. after mixing) and added to the mixing bowl. 2000 g flour+pea protein isolate were added to the mixing bowl and all ingredients were mixed for 3 min at 17 rpm and 6 min at 35 rpm using Spiral mixer (DIOSNA Dierks & Söhne GmbH, DE) to reach optimal dough conditions. The mixed dough was taken out of the mixing bowl and the dough temperature was controlled.

The dough was divided into pieces of 350 g each, rounded by hand, where after they rested for 15 min at room temperature covered by plastic. The rested dough pieces were shaped into breads in a sheeter (MO671 MPB-001, Glimek, SE) and transferred to greased 1200 ml pans (Top 160×110×85 mm). The breads were proofed at 32° C. at 86% humidity for 60 min. The proofed breads were baked for 35 min in a deck oven (Piccolo, Wachtel, DE) at 230° C. with steam. The breads were taken out of the pans and allowed to cool to room temperature.

The volumes of the breads were determined as described under volume determination.

TABLE 12

| Experimental design | | | | |
| --- | --- | --- | --- | --- |
| Dough number | 1 | 2 | 3 | 4 |
| Fungamyl 4000 SG (FAU/kg flour) | 16 | 16 | 16 | 16 |
| Novamyl 10000 BG (MANU/kg flour) | 0 | 2500 | 2500 | 2500 |
| Lipase of SEQ ID NO: 1 (mg enzyme protein/kg flour) | 0 | 0 | 0.95 | 0 |
| Lipase of SEQ ID NO: 2 (mg enzyme protein/kg flour) | 0 | 0 | 0 | 0.68 |

Volume Determination:

The volume and specific volume were measured using the Volscan profiler 600 (Stable microsystems, UK) running on the Volscan profiler software. Each bread was mounted in the machine. The weight of each loaf was automatically determined with the build-in balance of the Volscan instrument. The volume of each loaf was calculated from a 3D image created by the instrument when each loaf of bread was rotated with a speed of 1.5 revolutions per second while it was scanned with a laser beam taking 3 mm vertical steps per revolution. Specific volume was calculated for each bread according to the following formula:

Specific volume (ml/g)=volume (ml)/weight (g)

The reported value was the average of 4 breads from the same dough.

TABLE 13

| Results | | | | |
| --- | --- | --- | --- | --- |
| Dough number | 1 | 2 | 3 | 4 |
| Volume (ml) | 883.7 | 849.8 | 1157.5 | 1044.2 |
| Specific volume (ml/g) | 2.98 | 2.84 | 3.96 | 3.51 |

Conclusion

Addition of maltogenic alpha-amylase (dough 2) reduced volume slightly compared to dough 1. Addition of lipase SEQ ID1 (dough 3) increased bread volume (in ml) with 31% compared to dough 1 and SEQ ID2 (dough 4) increased volume with 18%.

Example 5. Lipase (SEQ ID NO:1) in Baking with Pea Protein Concentrate at Varying Mixing Times Breads were prepared using a straight dough procedure according to below recipe and process conditions. All chemicals applied were food grade. Fungal alpha-amylase (e.g. Fungamyl 4000 SG); maltogenic alpha-amylase (e.g. Novamyl 10000 BG) available from Novozymes A/S and lipase shown in to SEQ ID NO:1 were tested in concentrations according to the experimental design. Ingredients were added according to baker's percentage or ppm calculated based on the total amount of refined white flour and pea protein.

TABLE 14

| Dough Recipe | |
| --- | --- |
| Ingredient | Amount (on flour + pea protein basis) |
| Flour: | 75% Pelikaan and 25% Pea Protein 55 |
| Pelikaan (Refined white flour from Meneba, NL) | As stated in experimental design |
| Pea Protein 55 (Concentrate from AGT Food and Ingredients, Canada) | |
| Tap water | 57% or 66% as stated in experimental design |
| Yeast (fresh) | 4% |
| Vital Wheat Gluten (XXX) | 0% or 6% as stated in experimental design |
| Sucrose | 1.5% |
| Salt | 1.5% |
| Ascorbic acid | 100 ppm |
| Calcium Propionate | 0.3% |
| Fungamyl 4000 SG (4000 FAU/g) | 16 FAU/kg flour |
| Novamyl 10000 BG (10000 MANU/g) | 1000 MANU/kg flour |
| Sequence ID1 (SEQ ID NO: 1) | 0 or 0.76 mg enzyme protein/kg flour as stated in experimental design |

Procedure:

All ingredients were weighed out. Salt, sucrose, yeast, ascorbic acid, calcium propionate and enzyme were added to the mixing bowl. Tap water was weighed out, and the temperature adjusted with ice (to approx. 9-10° C., to reach a dough temperature of 27° C. after mixing) and added to the mixing bowl. 2000 g flour+pea protein (ratio as stated in experimental design) were added to the mixing bowl and all ingredients were mixed for 13, 18, 23 or 28 min at 17 rpm using Spiral mixer (DIOSNA Dierks & Söhne GmbH, DE) as indicated in the experimental design. The mixed dough was taken out of the mixing bowl and the dough temperature was measured.

The dough was divided into pieces of 350 g each, rounded by hand, where after they rested for 15 min at room temperature covered by plastic. The rested dough pieces were shaped into breads in a sheeter (MO671 MPB-001, Glimek, SE) and transferred to greased 1200 ml pans (Top 160×110×85 mm). The breads were proofed at 32° C. at 86% humidity for 60 min. The proofed breads were baked for 25 min in a deck oven (Piccolo, Wachtel, DE) at 210° C. without steam. The breads were taken out of the pans and allowed to cool to room temperature. Breads for texture analysis were packed in nitrogen in sealed plastic bags and stored at room temperature.

Dough parameters were evaluated by hand by as described in dough parameters. Dough color was measured as described under HunterLab. Volume of breads were determined as described under volume determination. Bread crumb characteristics (brightness and number of cells) were evaluated using C-cell as described under C-cell.

HunterLab

After mixing the dough color was measured using a handheld HunterLab (MinScan EZ; FMS jansen GmbH & Co). A piece of glass was placed on the dough and the results were reported as Lab values as an average of 3 measurements.

TABLE 15

| Experimental design | | | | | | | | | |
|---|---|---|---|---|---|---|---|---|---|
| Dough number | 1 | 2 | 3 | 4 | 5 | 6 | 7 | 8 | 9 |
| Ratio of Pelikaan (% of flour) | 75 | 75 | 75 | 75 | 75 | 75 | 75 | 75 | 75 |
| Ratio of Pea Protein 55 (% of flour) | 25 | 25 | 25 | 25 | 25 | 25 | 25 | 25 | 25 |
| Vital wheat gluten (%) | 6 | 6 | 6 | 6 | 6 | 6 | 6 | 6 | 0 |
| Water absorption (%) | 66 | 66 | 66 | 66 | 66 | 66 | 66 | 66 | 57 |
| Mixing time (minutes) | 13 | 13 | 18 | 18 | 23 | 23 | 28 | 28 | 23 |
| Fungamyl 4000 SG FAU/kg flour | 16 | 16 | 16 | 16 | 16 | 16 | 16 | 16 | 16 |
| Novamyl 10000 BG MANU/kg flour | 1000 | 1000 | 1000 | 1000 | 1000 | 1000 | 1000 | 1000 | 1000 |
| SEQ ID NO: 1 mg enzyme protein/kg flour | 0 | 0.76 | 0 | 0.76 | 0 | 0.76 | 0 | 0.76 | 0 |

Dough Parameters

The dough properties were evaluated approx. 2-10 min after mixing by a trained baker. A scale between 0-10 was used and dough properties were evaluated relative to a control (dough 1). The control given the value 5. Details regarding definition, evaluation and scale is found in below table.

Volume Determination:

The volume and specific volume were measured using the Volscan profiler 600 (Stable microsystems, UK) running on the Volscan profiler software. Each bread was mounted in the machine. The weight of each loaf was automatically determined with the build-in balance of the Volscan instrument. The volume of each loaf was calculated from a 3D

TABLE 16

| Dough evaluation method | | | |
|---|---|---|---|
| Parameter | Definition | Evaluation method | Scale |
| Softness | The degree to, or ease with, which a dough will compress or resist compression | Softness was measured by squeezing and feeling the dough by hand | Less soft 0-4 Control 5 More soft 6-10 |
| Elasticity | The ability of a dough to resist stretching as well as to return to its original size and share when the force is removed | A small piece of dough was gently pulled away from the dough ball to feel the resistance and elasticity. This was done twice on each dough. | Less elastic 0-4 Control 5 More elastic 6-10 |
| Stickiness | The degree to which a dough adheres to one's hands or other surfaces | The dough ball was cut open. Stickiness was evaluated by touch of the fresh cut by the whole palm of a hand | Less sticky 0-4 Control 5 More sticky 6-10 |
| Extensibility | The degree to which a dough can be stretched without tearing | A piece of dough was gently stretch to form a "window" to feel extensibility | Less extensible 0-4 Control 5 More extensible 6-10 | image created by the instrument when each loaf of bread was rotated with a speed of 1.5 revolutions per second while it was scanned with a laser beam taking 3 mm vertical steps per revolution. Specific volume was calculated for each bread according to the following formula:

Specific volume (ml/g)=volume (ml)/weight (g)

The reported value was the average of 3 breads from the same dough.

C-Cell

Crumb color (L*) and number of cells were measured on 3×2 cm thick slices from the middle of 2 breads which were scanned in a C-Cell (Calibre Instruments Ltd, Warrington, UK) using the standard method for collecting images and the standard C-Cell software for data analysis.

TABLE 17

| | | | | Results | | | | | |
|---|---|---|---|---|---|---|---|---|---|
| Parameter | Dough 1 | Dough 2 | Dough 3 | Dough 4 | Dough 5 | Dough 6 | Dough 7 | Dough 8 | Dough 9 |
| Dough stickiness | 5 | 5 | 3 | 3 | 3 | 3 | 3 | 3 | 4 |
| Dough softness | 5 | 5 | 3 | 3 | 3 | 3 | 2 | 2 | 4 |
| Dough extensibility | 5 | 7 | 5 | 7 | 5 | 7 | 5 | 7 | 7 |
| Dough elasticity | 5 | 5 | 7 | 7 | 7 | 7 | 8 | 8 | 6 |
| Dough color L* value | 70.8 | 71.0 | 74.3 | 72.7 | 73.1 | 72.5 | 73.3 | 74.0 | 73.0 |
| Dough color a* value | 5.1 | 4.9 | 3.7 | 4.0 | 3.8 | 4.2 | 3.8 | 3.8 | 4.3 |
| Dough color b* value | 31.5 | 30.5 | 26.6 | 25.1 | 24.7 | 25.5 | 23.6 | 23.6 | 27.1 |
| Bread volume (ml) | 1039.2 | 1296.5 | 1202.0 | 1484.2 | 1220.9 | 1447.1 | 1075.1 | 1392.3 | 1014.9 |
| Specific Volume (ml/g) | 3.18 | 4.03 | 3.69 | 4.64 | 3.74 | 4.49 | 3.27 | 4.29 | 3.07 |
| Crumb color L* | 47.4 | 53.0 | 51.6 | 54.3 | 49.9 | 54.5 | 48.1 | 52.5 | 52.3 |
| Number of cells | 5056 | 6211 | 6065 | 7156 | 5641 | 6536 | 5255 | 5858 | 4936 |

Conclusion

Increasing mixing time reduced stickiness, reduced softness, increased elasticity and reduced the yellow color of the dough (decrease in b*). Addition of lipase SEQ ID NO:1 increased extensibility and increased dough whiteness (increase in L*) irrespectively of mixing time. The highest bread volume was observed after 18 and 23 minutes of mixing time. A white and even bread crumb was noticed with an increased number of cells when lipase SEQ ID NO:1 had been added to the dough.

The invention claimed is:

1. A dough for a baked- or par-baked yeast-raised product, said dough comprising added pulse and/or legume protein and at least one added lipase enzyme, wherein at least 2% (w/w) of the total flour content is added pulse and/or legume protein, wherein the baked or par-baked yeast-raised product produced by the dough has an improved volume compared to an otherwise identical dough which does not comprise a lipase.

2. The dough according to claim 1, wherein the pulse and/or legume protein is added in the form of pulse and/or legume flour, processed pulse and/or legume flour, deflavoured pulse and/or legume flour, or protein concentrate and/or isolate made essentially from pulse and/or legume flour.

3. The dough according to claim 1, wherein at least 4% (w/w) of the total flour content is added pulse and/or legume protein.

4. The dough according to claim 1, wherein the dough also comprises gluten.

5. The dough according to claim 1, wherein the at least one added lipase enzyme comprises a lipase and/or a phospholipase, or a mature lipase and/or mature phospholipase.

6. The dough according to claim 1, wherein the at least one added lipase enzyme comprises a mature lipase having amino acid sequence at least 70% identical to one or more of the sequences shown in SEQ ID NO: 1, SEQ ID NO: 2, SEQ ID NO: 3, SEQ ID NO: 4 and SEQ ID NO: 5.

7. The dough according to claim 1, wherein the at least one added lipase enzyme is added in an amount in the range of greater than 0 to 100 mg enzyme protein/kg flour.

8. The dough according to claim 1, also comprising at least one additional added enzyme.

9. The dough according to claim 8, wherein the at least one additional added enzyme comprises a mature maltogenic alpha-amylase.

10. The dough according to claim 9, wherein the mature maltogenic alpha-amylase is added in an amount in the range of 0 to 10,000 MANU/kg flour.

11. The dough according to claim 8, wherein the at least one additional added enzyme comprises a mature alpha amylase.

12. The dough according to claim 11, wherein the additional mature alpha-amylase is added in an amount in the range of 0 to 1,000 FAU/kg flour.

13. A method of producing a dough as defined in claim 1 for a baked or par-baked yeast-raised product, the method comprising adding pulse and/or legume protein and at least one lipase enzyme to a dough, wherein at least 2% (w/w) of the total flour content is added pulse and/or legume protein, wherein the baked or par-baked yeast-raised product produced by the dough has an improved volume compared to an otherwise identical dough which does not comprise a lipase.

14. The method according to claim 13, wherein at least 4% (w/w) of the total flour content is added pulse and/or legume protein.

15. The method according to claim 13, wherein the dough also comprises gluten.

16. The method according to claim 13, wherein the dough is mixed:
   a) at least 5 minutes at a slow mixing speed, preferably in the range of 5-50 rpm; and optionally
   b) the dough is subsequently mixed at a faster speed.

17. The method of claim 13, comprising the additional step of baking or par-baking the dough, wherein the at least one lipase enzyme improves the volume of the baked product 1 hour after baking or 1 hour after final bake-off of the par-baked product, compared with a baked or par-baked product made from dough without the at least one lipase enzyme.

18. A method of producing a baked or par-baked product comprising pulse and/or legume protein, the method comprising the steps of:

a) providing a dough as defined in claim 1; and b) baking or par-baking the dough, whereby the baked or par-baked product is produced.

19. The dough according to claim 1, wherein the pulse and/or legume protein is added in the form of pulse and/or legume flour comprising lentil protein, chickpea protein, pea protein and/or faba bean protein, or a protein concentrate and/or isolate thereof.

* * * * *